United States Patent
Shorey et al.

(10) Patent No.: US 9,026,492 B1
(45) Date of Patent: May 5, 2015

(54) MULTISITE REPLICATION WITH UNCOORDINATED CYCLE SWITCHING

(75) Inventors: Oliver M. D. Shorey, Berks (GB); Dan Arnon, Somerville, MA (US); David Meiri, Cambridge, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/429,498

(22) Filed: Mar. 26, 2012

(51) Int. Cl.
*G06F 17/30* (2006.01)

(52) U.S. Cl.
CPC ................................. *G06F 17/30578* (2013.01)

(58) Field of Classification Search
CPC .................................................. G06F 17/30578
USPC ......................................... 707/613, 658, 614
See application file for complete search history.

(56) References Cited

U.S. PATENT DOCUMENTS

| | | | |
|---|---|---|---|
| 5,206,939 A | 4/1993 | Yanai et al. | |
| 5,742,792 A | 4/1998 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 7,054,883 B2 | 5/2006 | Meiri et al. | |
| 7,934,065 B2 * | 4/2011 | Iwamura et al. | 711/161 |
| 8,103,691 B2 * | 1/2012 | Chunilal | 707/769 |
| 8,145,601 B2 * | 3/2012 | Zizys et al. | 707/640 |
| 2006/0053121 A1 * | 3/2006 | Zizys et al. | 707/707 |
| 2006/0069887 A1 | 3/2006 | LeCrone et al. | |
| 2009/0327805 A1 * | 12/2009 | Thiel et al. | 714/15 |
| 2010/0191884 A1 * | 7/2010 | Holenstein et al. | 710/200 |
| 2012/0323848 A1 * | 12/2012 | Hildebrand et al. | 707/613 |
| 2013/0238555 A1 * | 9/2013 | Driesen et al. | 707/613 |

OTHER PUBLICATIONS

U.S. Appl. No. 13/077,262, filed Mar. 31, 2011, Natanzon, et al.

* cited by examiner

*Primary Examiner* — Robert Beausoliel, Jr.
*Assistant Examiner* — Alexandria Bromell
(74) *Attorney, Agent, or Firm* — Muirhead and Saturnelli, LLC

(57) ABSTRACT

Handling asynchronous data provided by at least two sources includes receiving a first portion of the data from a first one of the sources, receiving a second portion of the data from a second one of the sources, where the first and second portions provide the same data, and saving at least one of the portions containing more recent data. The sources may be synchronized with each other to contain the same data. All of the portions may be saved. A portion that contains data that is older than the more recent data may be discarded. Handling asynchronous data provided by at least two sources may also include establishing an active leg for data provided by one of the sources, establishing a passive leg for data provided by an other one of the sources, and saving data provided through the active leg.

16 Claims, 16 Drawing Sheets

US 9,026,492 B1

MULTISITE REPLICATION WITH UNCOORDINATED CYCLE SWITCHING

BACKGROUND OF THE INVENTION

1. Technical Field

This application relates to computer storage devices, and more particularly to the field of transferring data between storage devices.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

In some instances, it may be desirable to copy data from one storage device to another. For example, if a host writes data to a first storage device, it may be desirable to copy that data to a second storage device provided in a different location so that if a disaster occurs that renders the first storage device inoperable, the host (or another host) may resume operation using the data of the second storage device. Such a capability is provided, for example, by a Remote Data Facility (RDF) product provided by EMC Corporation of Hopkinton, Mass., e.g., Symmetrix Remote Data Facility (SRDF). With RDF, a first storage device, denoted the "primary storage device" (or "R1") is coupled to the host. One or more other storage devices, called "secondary storage devices" (or "R2") receive copies of the data that is written to the primary storage device by the host. The host interacts directly with the primary storage device, but any data changes made to the primary storage device are automatically provided to the one or more secondary storage devices using RDF. The primary and secondary storage devices may be connected by a data link, such as an ESCON link, a Fibre. Channel link, and/or a Gigabit Ethernet link. The RDF functionality may be facilitated with an RDF adapter (RA) provided at each of the storage devices.

RDF may be used to provide backup systems for disaster recovery where one or more backup sites are maintained as minors of a primary site using RDF. When the primary site fails, work may be resumed at a backup site. Note, however, that different types of RDF transfers may be used with different tradeoffs for each. Synchronous RDF (SRDF/S) provides the most current version of the data, but often requires close proximity of the sites since data written to a primary site is not acknowledged until the data is written to the backup site. Close proximity (e.g., within same geographic area) may be undesirable for a disaster recovery system since there is a higher probability that a single disaster can cause both sites to fail. On the other hand, asynchronous RDF (SRDF/A) does not require close proximity of the sites, but the copy of the data at the backup site is usually delayed by a significant amount of time (e.g., five minutes), which may be unacceptable or undesirable in some instances.

The deficiencies of both SRDF/S and SRDF/A are addressed by a system that uses both, which is described in U.S. Patent Publication 2006/0069887 to LeCrone, et al. titled "TRIANGULAR ASYNCHRONOUS REPLICATION", which is incorporated by reference herein. A drawback of triangular asynchronous replication is that it requires the synchronous R2 device to be passive so that no writes to the R2 device are allowed except in connection with maintaining the synchronous mirror. If it is desirable to use systems that provide mirroring and allow host writes to both devices (called "active/active systems"), then triangular asynchronous replication cannot be used.

Accordingly, it is desirable to provide a system that allows for providing an asynchronous backup site of active/active synchronous sites. Such a system provides the synchronous and asynchronous backup sites that are useful in a triangular replication system while still allowing modifications to both of the synchronous sites.

SUMMARY OF THE INVENTION

According to the system described herein, handling asynchronous data provided by at least two sources includes receiving a first portion of the data from a first one of the sources, receiving a second portion of the data from a second one of the sources, where the first and second portions provide the same data, and saving at least one of the portions containing more recent data. The sources may be synchronized with each other to contain the same data. All of the portions may be saved. A portion that contains data that is older than the more recent data may be discarded. Handling asynchronous data provided by at least two sources may also include establishing an active leg for data provided by one of the sources, establishing a passive leg for data provided by another one of the sources, and saving data provided through the active leg. Handling asynchronous data provided by at least two sources may also include discarding data provided through the passive leg that is older than data previously provided through the active leg. Handling asynchronous data provided by at least two sources may also include temporarily saving data provided through the passive leg that is not older than data previously provided through the active leg. Data from the passive leg that has been saved temporarily may be discarded following receipt of newer data through the active leg. Handling asynchronous data provided by at least two sources may also include swapping active and passive legs in response to there being data from the passive leg already saved when additional data is received through the passive leg. Handling asynchronous data provided by at least two sources may also include combining additional data received through the passive leg and data from the passive leg already saved.

According further to the system described herein, computer software, provided in a non-transitory computer-readable medium, handles asynchronous data provided by at least two sources. The software includes executable code that receives a first portion of the data from a first one of the sources, executable code that receives a second portion of the data from a second one of the sources, where the first and second portions provide the same data, and executable code that saves at least one of the portions containing more recent data. The sources may be synchronized with each other to contain the same data. All of the portions may be saved. A portion that contains data that is older than the more recent data may be discarded. The software may also include executable code that establishes an active leg for data provided by one of the sources, executable code that establishes a passive leg for data provided by an other one of the sources, and executable code that saves data provided through the active leg. The software may also include executable code that discards data provided through the passive leg that is older than data previously provided through the active leg. The software may also include executable code that temporarily saves data provided through the passive leg that is not older than data previously provided through the active leg. Data from the passive leg that has been saved temporarily may be discarded following receipt of newer data through the active leg. The software may also include executable code that swaps active and passive legs in response to there being data from the passive leg already saved when additional data is received through the passive leg. The software may also include executable code that combines additional data received through the passive leg and data from the passive leg already saved.

According further to the system described herein, handling asynchronous data provided by at least two sources includes synchronizing data between the at least two sources, coordinating cycle switching between the at least two sources, where an asynchronous cycle of data from one of the sources corresponds to an asynchronous cycle of data from an other one of the sources, receiving asynchronous data corresponding to a data cycle from at least one of the sources, and saving at least some of the received data. A first portion of data for a particular cycle may be transmitted from one of the sources and a second portion of data for the particular cycle, different from the first portion of data, may be transmitted from an other one of the sources and the first portion and the second portion together may correspond to all of the data for the particular cycle. A particular criteria may be used to determine whether data is provided in the first portion of data. The particular criteria may include volume identifier and/or whether data was written locally to a particular one of the sources. The particular criteria may include the volume identifier and data for volumes having an identifier meeting a specific criteria may be provided for the first portion and data for volumes having an identifier that does not meet the specific criteria may be provided for the second portion. Handling asynchronous data provided by at least two sources may also include maintaining a bitmap at each of the sources indicating data in a portion for an other one of the sources. Following failure of one of the sources, an other one of the sources may use the bitmap to transmit data that was set for transmission by one of the sources prior to failure thereof. All of the data for a particular cycle may be transmitted by one of the sources and all of the data for the particular cycle may be transmitted by an other one of the sources and where duplicate asynchronous data that is received may be discarded. Handling asynchronous data provided by at least two sources may also include suspending asynchronous transfer for a particular one of the sources following failure of the particular one of the sources. Handling asynchronous data provided by at least two sources may also include reenabling asynchronous transfer for the particular one of the sources following resynchronization of the particular one of the sources with at least one other one of the sources.

According further to the system described herein, computer software, provided in a non-transitory computer-readable medium, that handles asynchronous data provided by at least two sources having synchronized data therebetween. The software includes executable code that coordinates cycle switching between the at least two sources, where an asynchronous cycle of data from one of the sources corresponds to an asynchronous cycle of data from an other one of the sources, executable code that receives asynchronous data corresponding to a data cycle from at least one of the sources, and executable code that saves at least some of the received data. A first portion of data for a particular cycle may be transmitted from one of the sources and a second portion of data for the particular cycle, different from the first portion of data, may be transmitted from an other one of the sources and where the first portion and the second portion together may correspond to all of the data for the particular cycle. The particular criteria may be used to determine whether data is provided in the first portion of data. The particular criteria may include volume identifier and/or whether data was written locally to a particular one of the sources. The particular criteria may include the volume identifier and data for volumes having an identifier meeting a specific criteria may be provided for the first portion and data for volumes having an identifier that does not meet the specific criteria may be provided for the second portion. The software may also include executable code that maintains a bitmap at each of the sources indicating data in a portion for an other one of the sources. Following failure of one of the sources, an other one of the sources may use the bitmap to transmit data that was set for transmission by one of the sources prior to failure thereof. All of the data for a particular cycle may be transmitted by one of the sources and all of the data for the particular cycle may be transmitted by an other one of the sources and duplicate asynchronous data that is received may be discarded. The computer software may also include executable code that suspends asynchronous transfer for a particular one of the sources following failure of the particular one of the sources. The computer software may also include executable code that reenables asynchronous transfer for the particular one of the sources following resynchronization of the particular one of the sources with at least one other one of the sources.

DETAILED DESCRIPTION OF VARIOUS EMBODIMENTS

Figure 1:
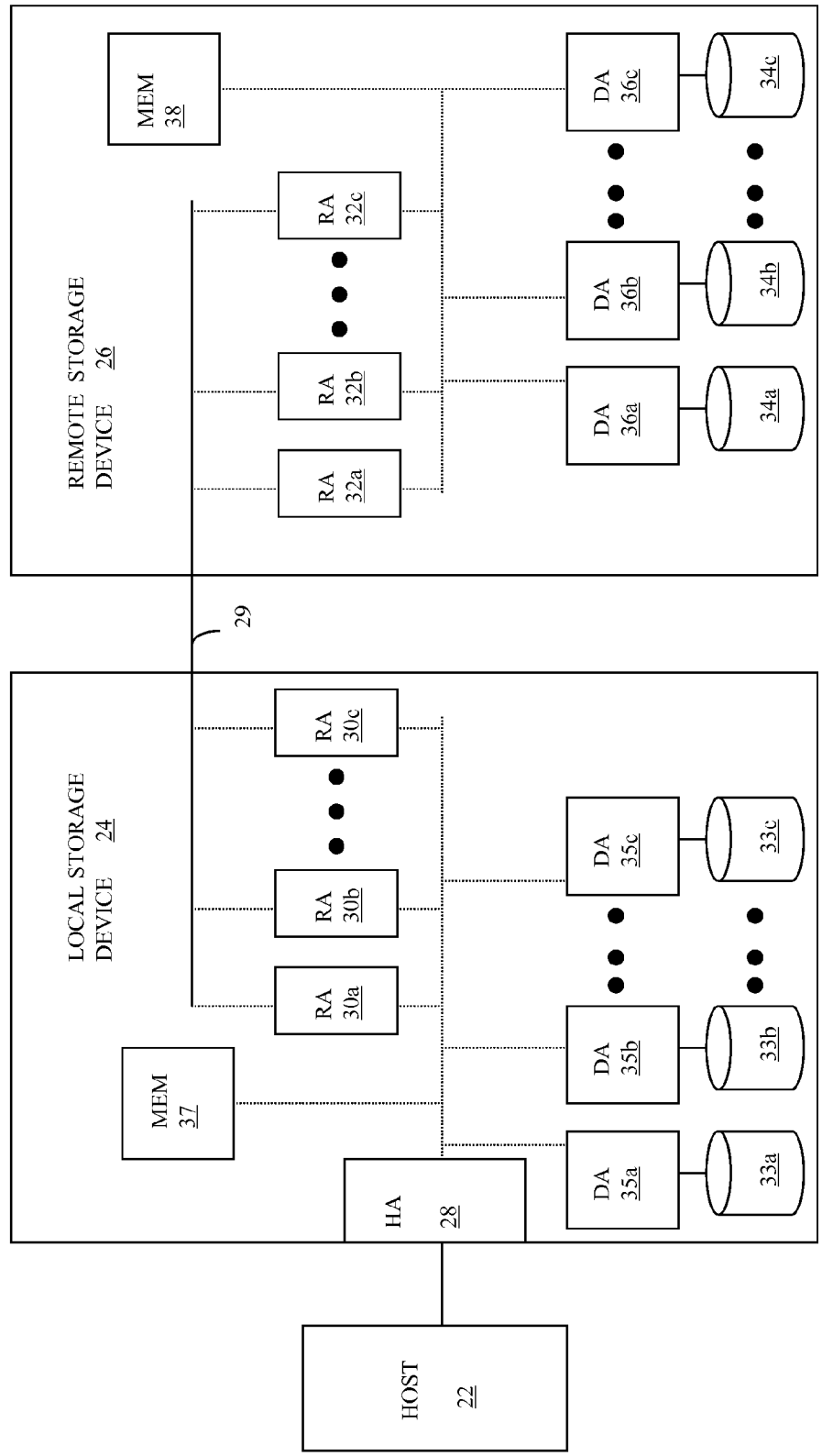
FIG. 1 is a schematic diagram showing a host, a local storage device, and a remote data storage device used in connection with an embodiment of the system described herein.

Referring to FIG. 1, a diagram 20 shows a relationship between a host 22, a local storage device 24, and a remote storage device 26. The host 22 reads and writes data from and to the local storage device 24 via a host adapter (HA) 28, which facilitates the interface between the host 22 and the local storage device 24. Although the diagram 20 only shows one host 22 and one HA 28, it will be appreciated by one of ordinary skill in the art that multiple HA's may be used and that one or more HA's may have one or more hosts coupled thereto.

Data from the local storage device 24 is copied to the remote storage device 26 via a link 29 to cause the data on the remote storage device 26 to be identical to the data on the local storage device 24. In an embodiment herein, data may be copied using a synchronous RDF protocol (SRDR/S), an asynchronous RDF protocol (SRDF/A), and data mobility (DM) copy mode, a non-ordered background copy mode. Of course, other data copy modes may also be used. Communication using synchronous RDF is described, for example, in U.S. Pat. No. 5,742,792 titled "REMOTE DATA MIRRORING" to Yanai, et al., which is incorporated by reference herein. Communication using asynchronous RDF is described, for example, in U.S. Pat. No. 7,054,883 titled "VIRTUAL ORDERED WRITES FOR MULTIPLE STORAGE DEVICES" to Meiri, et al., which is incorporated by reference herein.

Although only one link is shown (the link 29), it is possible to have additional links between the storage devices 24, 26 and to have links between one or both of the storage devices 24, 26 and other storage devices (not shown). In addition, the link 29 may be provided using a direct connection (wired, over-the-air, or some combination thereof), a network (such as the Internet), or any other appropriate means for conveying data. Note that there may be a time delay between the transfer of data from the local storage device 24 to the remote storage device 26, so that the remote storage device 26 may, at certain points in time, contain data that is not identical to the data on the local storage device 24.

The local storage device 24 includes a first plurality of RDF adapter units (RA's) 30a, 30b, 30c and the remote storage device 26 includes a second plurality of RA's 32a-32c. The RA's 30a-30c, 32a-32c are coupled to the RDF link 29 and are similar to the host adapter 28, but are used to transfer data between the storage devices 24, 26. The software used in connection with the RA's 30a-30c, 32a-32c is discussed in more detail elsewhere herein.

The storage devices 24, 26 may include one or more disks, each containing a different portion of data stored on each of the storage devices 24, 26. FIG. 1 shows the storage device 24 including a plurality of disks 33a, 33b, 33c and the storage device 26 including a plurality of disks 34a, 34b, 34c. The remote data copying functionality described herein may be applied so that the data for at least a portion of the disks 33a-33c of the local storage device 24 is copied, using RDF or a different mechanism, to at least a portion of the disks 34a-34c of the remote storage device 26. It is possible that other data of the storage devices 24, 26 is not copied between the storage devices 24, 26, and thus is not identical.

Each of the disks 33a-33c may be coupled to a corresponding disk adapter unit (DA) 35a, 35b, 35c that provides data to a corresponding one of the disks 33a-33c and receives data from a corresponding one of the disks 33a-33c. Similarly, a plurality of DA's 36a, 36b, 36c of the remote storage device 26 may be used to provide data to corresponding ones of the disks 34a-34c and receive data from corresponding ones of the disks 34a-34c. An internal data path exists between the DA's 35a-35c, the HA 28 and the RA's 30a-30c of the local storage device 24. Similarly, an internal data path exists between the DA's 36a-36c and the RA's 32a-32c of the remote storage device 26. Note that, in other embodiments, it is possible for more than one disk to be serviced by a DA and that it is possible for more than one DA to service a disk.

The local storage device 24 also includes a global memory 37 that may be used to facilitate data transferred between the DA's 35a-35c, the HA 28 and the RA's 30a-30c. The memory 37 may contain tasks that are to be performed by one or more of the DA's 35a-35c, the HA 28 and the RA's 30a-30c, and a cache for data fetched from one or more of the disks 33a-33c. Similarly, the remote storage device 26 includes a global memory 38 that may contain tasks that are to be performed by one or more of the DA's 36a-36c and the RA's 32a-32c, and a cache for data fetched from one or more of the disks 34a-34c. Use of the memories 37, 38 is described in more detail hereinafter.

The storage space in the local storage device 24 that corresponds to the disks 33a-33c may be subdivided into a plurality of volumes or logical devices. The logical devices may or may not correspond to the physical storage space of the disks 33a-33c. Thus, for example, the disk 33a may contain a plurality of logical devices or, alternatively, a single logical device could span both of the disks 33a, 33b. Similarly, the storage space for the remote storage device 26 that comprises the disks 34a-34c may be subdivided into a plurality of volumes or logical devices, where each of the logical devices may or may not correspond to one or more of the disks 34a-34c.

Providing a mapping between portions of the local storage device 24 and the remote storage device 26 involves setting up a logical device on the remote storage device 26 that is a remote mirror for a logical device on the local storage device 24. The host 22 reads and writes data from and to the logical device on the local storage device 24 and the mapping causes modified data to be transferred from the local storage device 24 to the remote storage device 26 using the RA's, 30a-30c, 32a-32c and the link 29. In steady state operation, the logical device on the remote storage device 26 contains data that is identical to the data of the logical device on the local storage device 24. When the RDF mechanism is used, the logical device on the local storage device 24 that is accessed by the host 22 is referred to as the "R1 volume" (or just "R1") while the logical device on the remote storage device 26 that contains a copy of the data on the R1 volume is called the "R2 volume" (or just "R2"). Thus, the host reads and writes data from and to the R1 volume and RDF handles automatic copying and updating of the data from the R1 volume to the R2 volume. The system described herein may be implemented using software, hardware, and/or a combination of software and hardware where software may be stored in an appropriate storage medium and executed by one or more processors.

Figure 2:
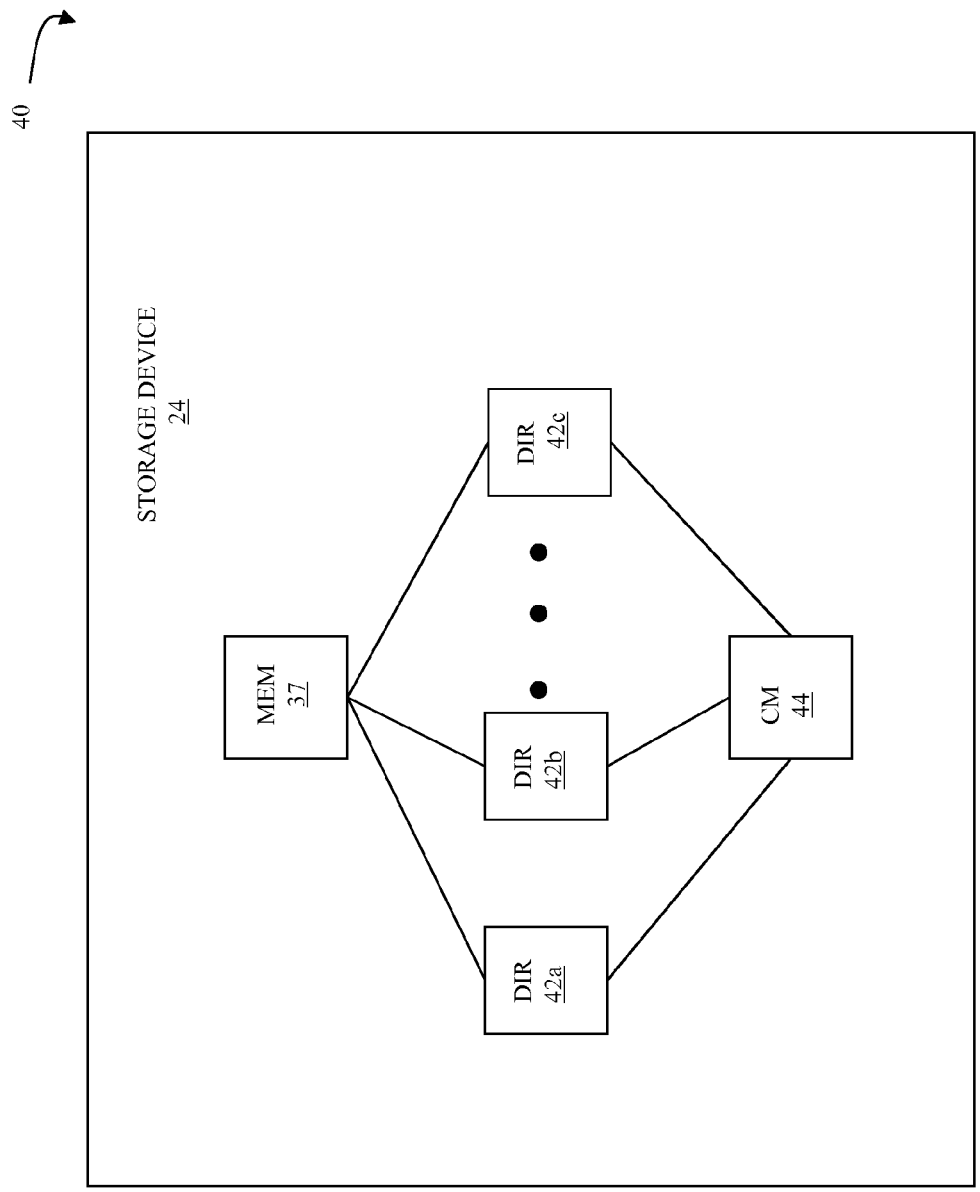
FIG. 2 is a schematic diagram showing a storage device, memory, a plurality of directors, and a communication module that may be used in connection with an embodiment of the system described herein.

Referring to FIG. 2, a diagram 40 illustrates an embodiment of the storage device 24 where each of a plurality of directors 42a-42c are coupled to the memory 37. Each of the directors 42a-42c represents the HA 28 (and/or other HA's), the RA's 30a-30c, or DA's 35a-35c. In an embodiment disclosed herein, there may be up to sixty four directors coupled to the memory 37. Of course, for other embodiments, there may be a higher or lower maximum number of directors that may be used.

The diagram 40 also shows an optional communication module (CM) 44 that provides an alternative communication path between the directors 42a-42c. Each of the directors 42a-42c may be coupled to the CM 44 so that any one of the directors 42a-42c may send a message and/or data to any other one of the directors 42a-42c without needing to go through the memory 37. The CM 44 may be implemented using conventional MUX/router technology where a sending one of the directors 42a-42c provides an appropriate address to cause a message and/or data to be received by an intended receiving one of the directors 42a-42c. Some or all of the functionality of the CM 44 may be implemented using one or more of the directors 42a-42c so that, for example, the directors 42a-42c may be interconnected directly with the interconnection functionality being provided on each of the directors 42a-42c. In addition, a sending one of the directors 42a-42c may be able to broadcast a message to all of the other directors 42a-42c at the same time.

In some embodiments, one or more of the directors 42a-42c may have multiple processor systems thereon and thus may be able to perform functions for multiple directors. In some embodiments, at least one of the directors 42a-42c having multiple processor systems thereon may simultaneously perform the functions of at least two different types of directors (e.g., an HA and a DA). Furthermore, in some embodiments, at least one of the directors 42a-42c having multiple processor systems thereon may simultaneously perform the functions of at least one type of director and perform other processing with the other processing system. In addition, all or at least part of the global memory 37 may be provided on one or more of the directors 42a-42c and shared with other ones of the directors 42a-42c.

Note that, although specific storage device configurations are disclosed in connection with FIG. 1 and FIG. 2, it should be understood that the system described herein may be implemented on any appropriate platform. Thus, the system described herein may be implemented using a platform like that described in connection with FIG. 1 and/or FIG. 2 or may be implemented using a platform that is somewhat or even completely different from any particular platform described herein.

Figure 3:
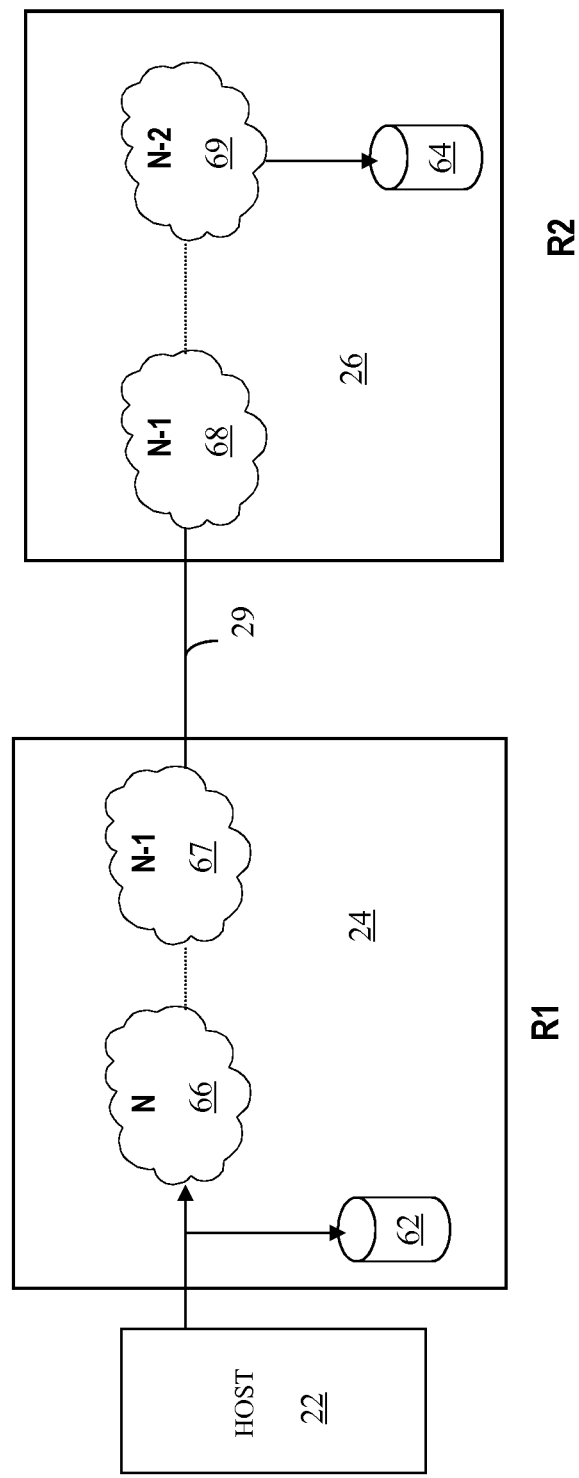
FIG. 3 is a schematic diagram showing a flow of data between a host, a local storage device, and a remote data storage device used in connection with an embodiment of the system described herein.

Referring to FIG. 3, a path of data is illustrated from the host 22 to the local storage device 24 and the remote storage device 26. Data written from the host 22 to the local storage device 24 is stored locally, as illustrated by the data element 62 of the local storage device 24. The data that is written by the host 22 to the local storage device 24 is also maintained by the local storage device 24 in connection with being sent by the local storage device 24 to the remote storage device 26 via the link 29.

In the system described herein, each data write by the host 22 (of, for example a record, a plurality of records, a track, etc.) is assigned a sequence number. The sequence number may be provided in an appropriate data field associated with the write. In FIG. 3, the writes by the host 22 are shown as being assigned sequence number N. All of the writes performed by the host 22 that are assigned sequence number N are collected in a single chunk of data 66. The chunk 66 represents a plurality of separate writes by the host 22 that occur at approximately the same time. The chunk 66 may be referred to as the "capture chunk" and data therein may be referred to as "capture data".

Generally, the local storage device 24 accumulates chunks of one sequence number while transmitting a previously accumulated chunk (having the previous sequence number) to the remote storage device 26. Thus, while the local storage device 24 is accumulating writes from the host 22 that are assigned sequence number N, the writes that occurred for the previous sequence number (N−1) are transmitted by the local storage device 24 to the remote storage device 26 via the link 29. A chunk 67 represents writes from the host 22 that were assigned the sequence number N−1 that have not been transmitted yet to the remote storage device 26. The chunk 67 may be referred to as the "transmit chunk" and data therein may be referred to as "transmit data".

The remote storage device 26 receives the data from the chunk 67 corresponding to writes assigned a sequence number N−1 and constructs a new chunk 68 of host writes having sequence number N−1. The data may be transmitted using appropriate RDF protocol that acknowledges data sent across the link 29. The chunk 68 may be referred to as the "receive chunk" and data therein may be referred to as "receive data".

When the remote storage device 26 has received all of the data from the chunk 67, the local storage device 24 sends a commit message to the remote storage device 26 to commit all the data assigned the N−1 sequence number corresponding to the chunk 68. Generally, once a chunk corresponding to a particular sequence number is committed, that chunk may be written (destaged) to the logical storage device. This is illustrated in FIG. 3 with a chunk 69 corresponding to writes assigned sequence number N−2 (i.e., two before the current sequence number being used in connection with writes by the host 22 to the local storage device 24). The chunk 69 may be referred to as the "commit chunk" and data therein may be referred to as "commit data".

In FIG. 3, the chunk 69 is shown as being written (destaged) to a data element 64 representing disk storage for the remote storage device 26. Thus, the remote storage device 26 is receiving and accumulating the chunk 68 corresponding to sequence number N−1 while the chunk 69 corresponding to the previous sequence number (N−2) is being written to disk storage of the remote storage device 26 illustrated by the data element 64. In some embodiments, the data for the chunk 69 is marked for write (but not necessarily written immediately), while the data for the chunk 68 is not.

Thus, in operation, the host 22 writes, to the local storage device 24, data that is stored locally in the data element 62 and accumulated in the chunk 66. Once all of the data for a particular sequence number has been accumulated, the sequence number is incremented. Data from the chunk 67 corresponding to one less than the current sequence number is transferred from the local storage device 24 to the remote storage device 26 via the link 29. The chunk 69 corresponds to data for a sequence number that was committed by the local storage device 24 sending a message to the remote storage device 26. Data from the chunk 69 is written (destaged) to disk storage of the remote storage device 26.

Note that the writes within a particular one of the chunks 66-69 are not necessarily ordered. However, every write for the chunk 69 corresponding to sequence number N−2 was begun prior to beginning any of the writes for the chunks 67, 68 corresponding to sequence number N−1. In addition, every write for the chunks 67, 68 corresponding to sequence number N−1 was begun prior to beginning any of the writes for the chunk 66 corresponding to sequence number N. Thus, in the event of a communication failure between the local storage device 24 and the remote storage device 26, the remote storage device 26 may simply finish writing (destaging) the last committed chunk of data (the chunk 69 in the example of FIG. 3) and can be assured that the state of the data at the remote storage device 26 is ordered in the sense that the data element 64 contains all of the writes that were begun prior to a certain point in time and contains no writes that were begun after that point in time. Thus, R2 always contains a point in time copy of R1 and it is possible to reestablish a consistent image from the R2 device.

Figure 4:
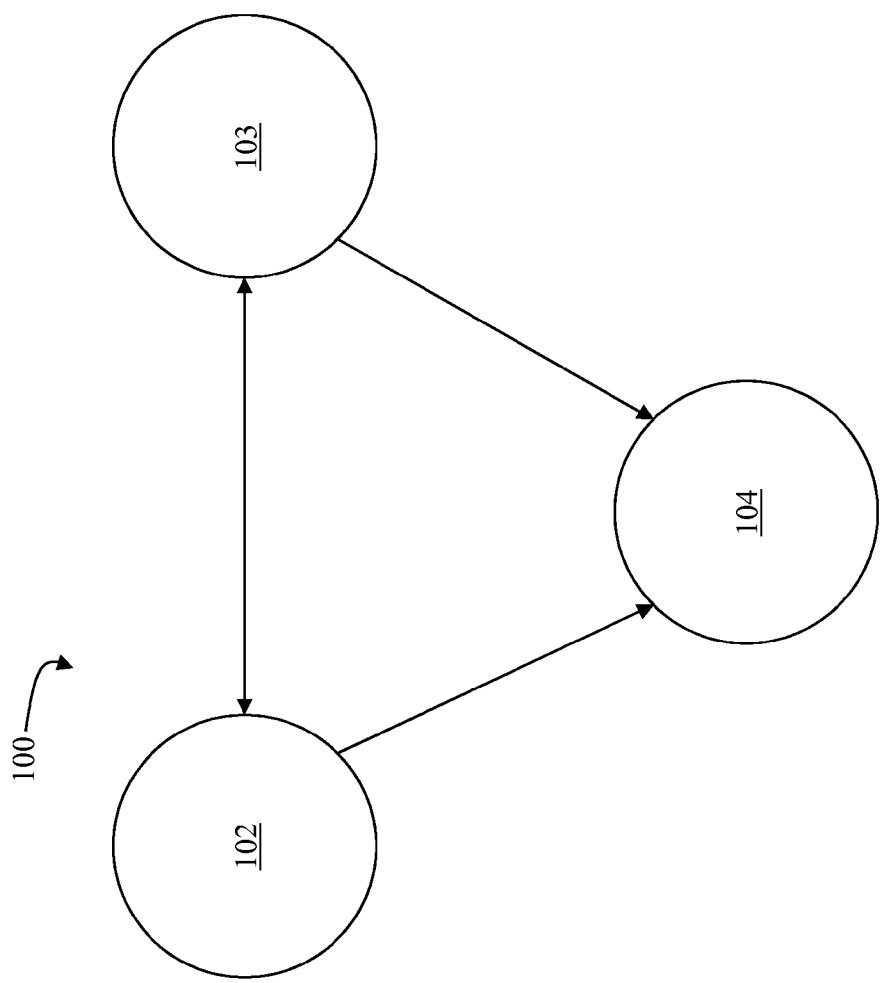
FIG. 4 is a schematic diagram showing three interconnected sites according to an embodiment of the system described herein.

Referring to FIG. 4, a diagram 100 illustrates a first site 102, a second site 103, and a third site 104. The sites 102-104 are interconnected to exchange data therebetween. Each of the sites 102-104 may include at least one processing device (not shown in FIG. 4), like the host 22, discussed above. Each of the sites 102-104 may also include at least one storage device (not shown in FIG. 4) that is like the storage device 24 discussed above. In some embodiments, one or more of the sites 102-104 includes other types of computing devices and/or storage devices in addition to, or instead of, computing devices and storage devices like those illustrated herein.

In an embodiment herein, the first site 102 may be a synchronous mirror of the second site 103 and vice versa so that data written by a computing device to a storage device at the first site 102 is synchronously copied to a storage device at the second site 103. Similarly, data written by a computing device to a storage device at the second site 103 is synchronously copied to a storage device at the first site 102. In another embodiment, the sites 102, 103 may be configured using the AccessAnywhere cache coherency feature of the VPLEX product provided by EMC Corporation of Hopkinton, Mass.

In yet another embodiment, any appropriate mechanism may be used to provide two way synchronous mirroring between the active (writable) sites 102, 103.

The first site 102 and the second site 103 may each provide asynchronous data to the third site 104. In an embodiment herein, the third site 104 may be maintained in a consistent (recoverable) state with respect to the data from the sites 102, 103. Thus, in the case of failure of one or both of the sites 102, 103, the system may be recovered using the third site 104 irrespective of when the first and/or second sites 102, 103 failed. In an embodiment herein, each of the sites 102-104 may provide the asynchronous copy of data at the site 104 using SRDF/A, which is provided by EMC Corporation of Hopkinton, Mass.

In other embodiments, other asynchronous transfer mechanism(s) may be used. Some instances that use other mechanisms may maintain the site 104 in a consistent state. For instances that do not, there may be difficulties recovering operations using the site 104 depending upon the circumstances that caused one or both of the sites 102, 103 to fail. Note also that it is not necessary for the asynchronous transfer from the site 102 to the site 104 to use the same mechanism as the asynchronous transfer from the site 103 to the site 104. In any event, for the discussion herein, the system is illustrated with the asynchronous transfers using the SRDF/A mechanism from the site 102 to the site 104 and from the site 103 to the site 104.

Note that the SRDF/A transfer mechanism switches cycles at the source volume. As discussed in more detail elsewhere herein, in some embodiments, the cycle switching for the site 102 may be independent of the cycle switching at the site 103 while for other embodiments, cycle switching for the sites 102, 103 may be coordinated using any appropriate mechanism, such as placing volumes in the sites 102, 103 in the same consistency group (grouped set of storage device that work together) or by using a mechanism like that described in U.S. Pat. No. 7,054,883 titled VIRTUAL ORDERED WRITES FOR MULTIPLE STORAGE DEVICES, which is incorporated by reference herein.

Figure 5:
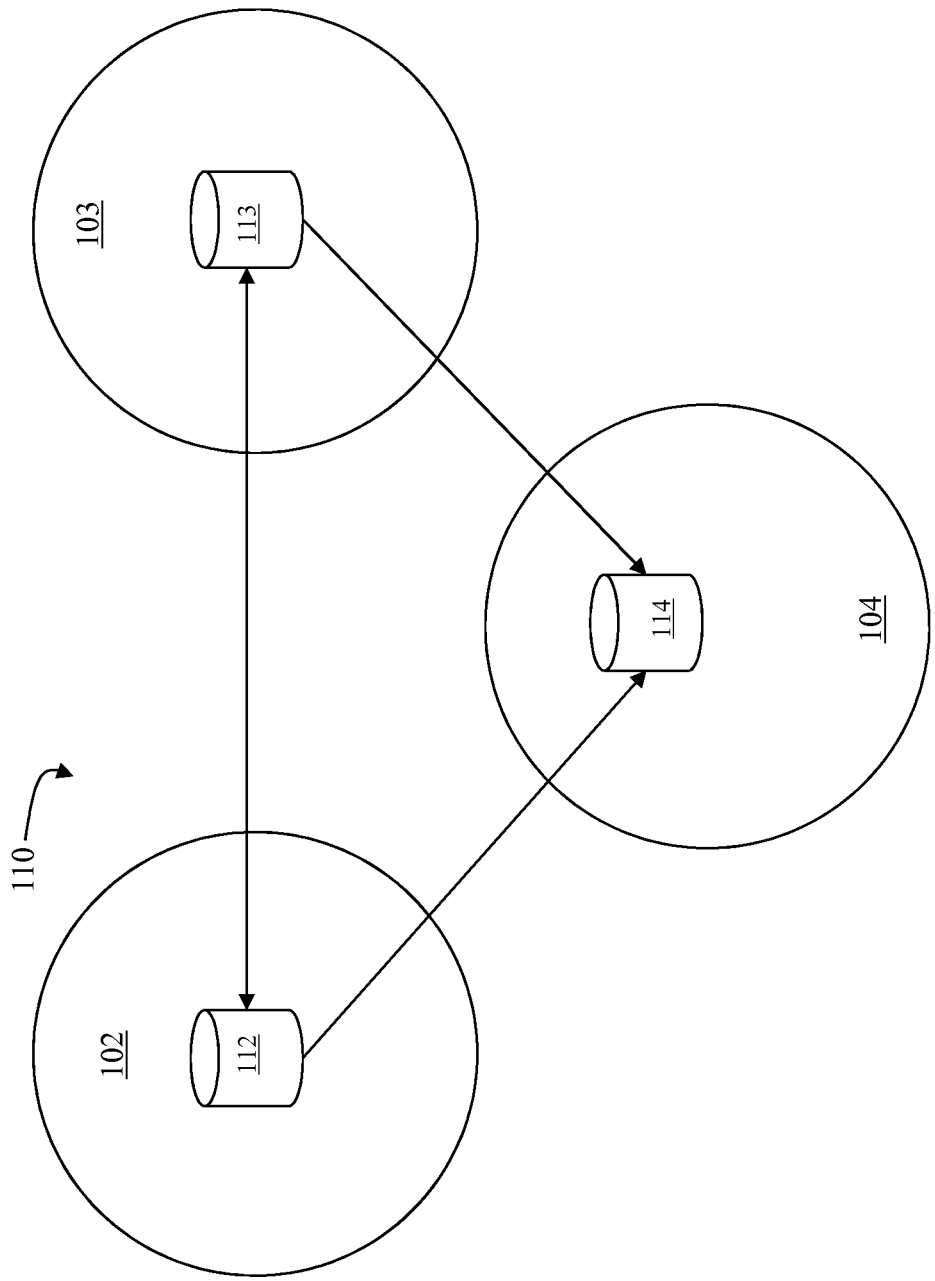
FIG. 5 is a schematic diagram showing storage devices ate three interconnected sites according to an embodiment of the system described herein.

Referring to FIG. 5, each of the sites 102-104 is shown with a corresponding storage volume provided therewith. The site 102 is shown as including the storage volume 112, the site 103 is shown as including the storage volume 113, and the site 104 is shown as including the storage volume 114. As discussed elsewhere herein, each of the sites 102-104 may contain any number of storage volumes/devices which may interact within each of the sites 102-104 with varying degrees of interdependence. Thus, for example, the storage volume 112 may be one of a number of storage volumes that are part of a consistency group within the site 102. The storage volumes 112-114 are shown in FIG. 5 to facilitate the discussion herein. Accordingly, it is to be understood, generally, that reference herein to a storage volume possibly includes multiple storage volumes, as appropriate, and that, in some instances, reference to a site includes reference to one or more storage volumes provided at the site.

Figure 6:
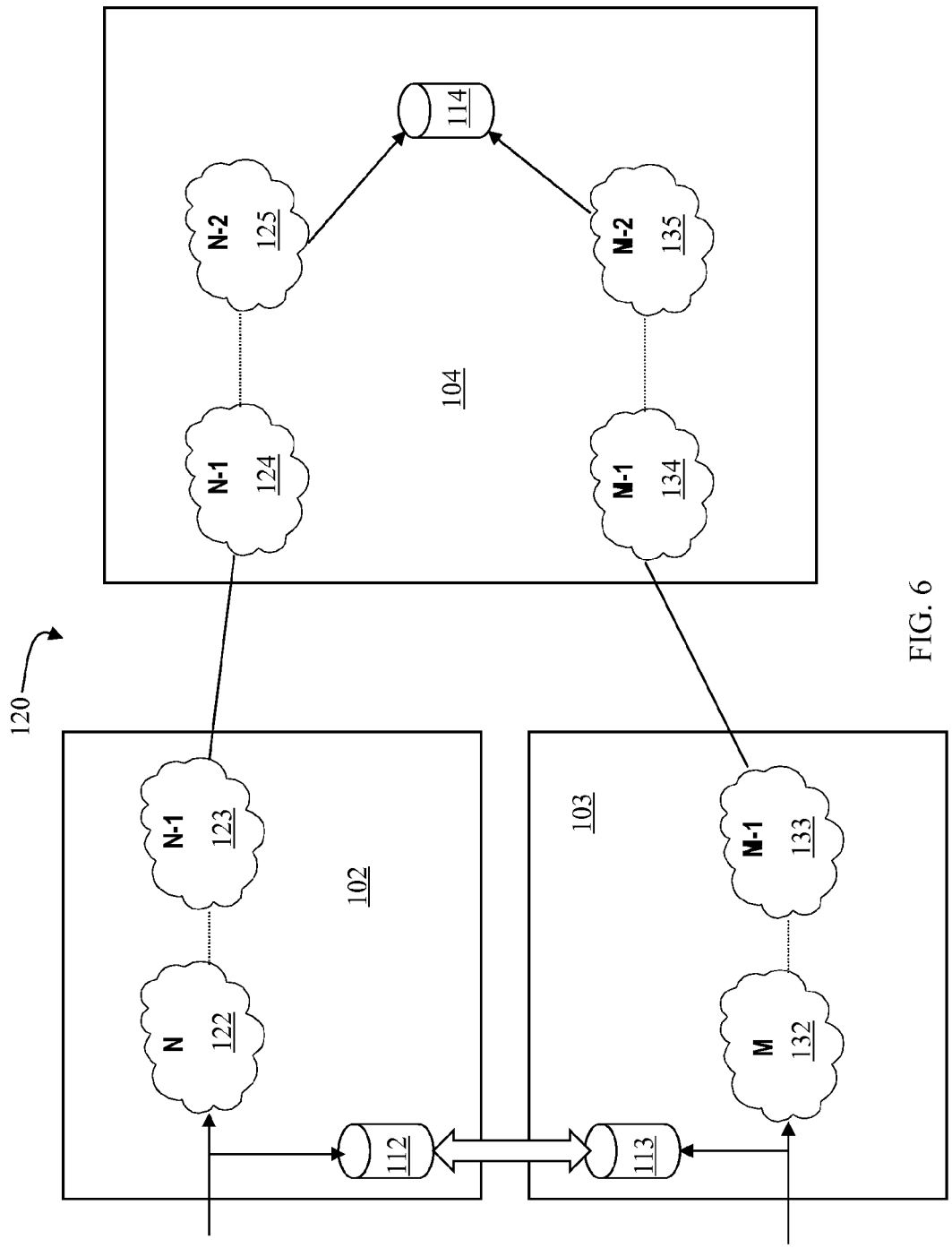
FIG. 6 is a schematic diagram showing a flow of data between two sites and a third site where data is redundantly received and written to a storage device according to an embodiment of the system described herein.

Referring to FIG. 6, a diagram 120 illustrates an embodiment of the system described herein in which each of the sites 102, 103 independently provide asynchronous data to the site 104. For the embodiment illustrated by FIG. 6, there is no coordinated cycle switching between the sites 102, 103. Data is written to the storage device 112 at the site 102 and, at the same time, placed in a capture buffer 122. After a cycle switch, data in the capture buffer 122 transitions to a transmit buffer 123. Data in the transmit buffer 123 is transferred to a receive buffer 124 at the site 104. After another cycle switch, the data transitions to a commit buffer 124, which may or may not be destaged to the storage device 114, as explained in more detail elsewhere herein.

A similar asynchronous transfer occurs between the site 103 and the site 104. Data is written to the storage device 113 at the site 103 and, at the same time, placed in a capture buffer 132. After a cycle switch, data in the capture buffer 132 transitions to a transmit buffer 133. Data in the transmit buffer 133 is transferred to a receive buffer 134 at the site 104. After another cycle switch, the data transitions to a commit buffer 134, which may or may not be destaged to the storage device 114, as explained in more detail elsewhere herein.

Because of the synchronous relationship between the sites 102, 103, data that is written to the storage device 112 by a computing device (or similar) is synchronously copied to the storage device 113. Similarly, data that is written to the storage device 113 by a computing device (or similar) is synchronously copied to the storage device 112. Synchronously copying data between the sites 102, 103 is independent of asynchronously transferring data from the site 102 to the site 104 and from the site 103 to the site 104.

Note that the embodiment illustrated by the diagram 120 of FIG. 6 may be used to copy data twice to the site 104; an entire version of the data is provided by the site 102 while another entire version is provided by the site 103. In steady state operation, the same data may be written twice (at somewhat different times) to the storage device 114 at the site 104. Although this embodiment is arguably wasteful of resources, it provides an advantage of simple failover and recovery operation. If one of the sites 102, 103 and/or a link thereto stops working, the other one of the sites may continue to provide data to the site 104 without needing to perform any failover processing. Similarly, when the failed site and/or link becomes operational, steady state operation resumes without any changes, as described elsewhere herein. Note also that a reduction in bandwidth of a link from one of the sites 102, 103 to the site 104 does not affect performance of the system with respect to the amount of data lost following a failure.

Figure 7:
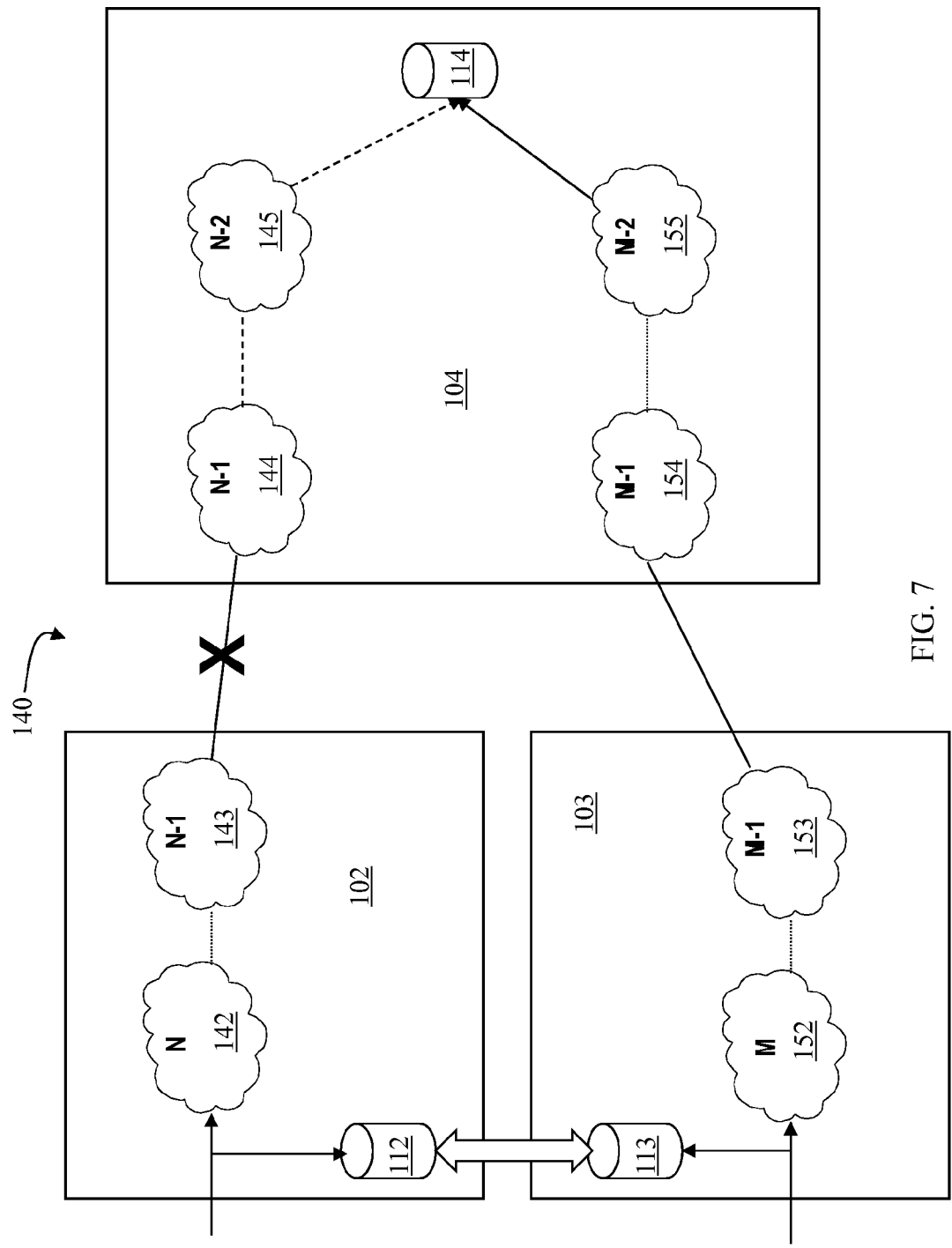
FIG. 7 is a schematic diagram showing a flow of data between two sites and a third site where data is redundantly received at a storage device according to an embodiment of the system described herein.

Referring to FIG. 7, a diagram 140 illustrates operation of the system discussed above in connection with the diagram 120 of FIG. 6 where the site 102 and/or links thereto have failed. Data is still asynchronously provided from the site 103 to the site 104. There is a capture buffer 142, a transmit buffer 143, a receive buffer 144 and a commit buffer 145 associated with the asynchronous transfer from the site 102 to the site 104. However, if the site 102 and/or the corresponding link thereto have failed, the buffers 144, 145 do not necessarily contain valid data. There is also a capture buffer 152, a transmit buffer 153, a receive buffer 154 and a commit buffer 155 associated with the asynchronous transfer from the site 103 to the site 104. Data that is written to the storage device 112 by a computing device (or similar) may still be synchronously copied to the storage device 113 while data that is written to the storage device 113 by a computing device (or similar) may still be synchronously copied to the storage device 112 in cases where the link has failed, but the site 102 has not failed.

The situation illustrated by the diagram 140 of FIG. 7 differs from steady-state operation illustrated by the diagram 120 of FIG. 6 in that data is not transmitted from the site 102 to the site 104. However, the system illustrated by FIG. 7 maintains the site 104 in a consistent state even though the site 102 and/or the link thereto has failed by using data from the site 103.

Figure 8:
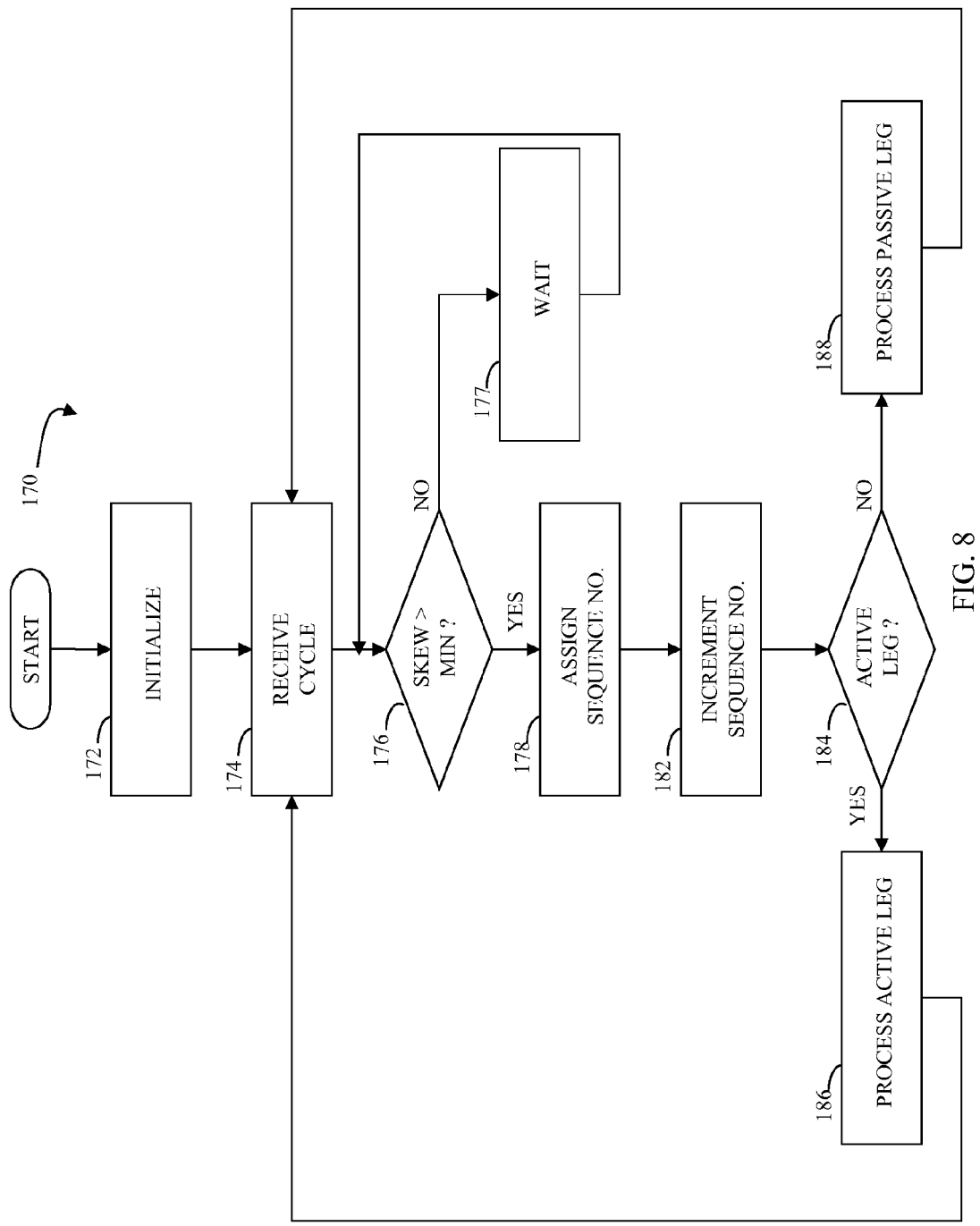
FIG. 8 is a flow chart illustrating steps performed in connection with receiving asynchronous data cycles according to an embodiment of the system described herein.

Referring to FIG. 8, a flow chart 170 illustrates processing performed in connection with handling incoming data from one of the sites 102, 103. Processing begins at a first step 172 where the system is initialized by assigning one of the commit buffers 145, 155 as part of a passive leg while assigning the other one of the commit buffers 145, 155 as part of an active leg. The designation of passive and active and processing associated therewith is described in more detail elsewhere herein. In an embodiment, the assignment at the step 172 may be random, or may be based on an appropriate metric.

Following the step 172 is a step 174 where the data is received using SRDF/A and one of the receive buffers 144, 154. Following the step 174 is a test step 176 where it is determined if a skew value is greater than a predetermined minimum amount. The skew is a measure of time between received cycles of the active and passive legs. In an embodiment herein, it is desirable to have a minimum amount of time between the receive cycles in order to avoid race conditions that occur because of propagation delays between the sites 102, 103. For example, it is possible to set the minimum skew to be three times the expected maximum propagation delay between the sites so that, if the expected maximum propagation delay is five seconds, the skew is set to fifteen seconds. Of course, other techniques may be used to determine a minimum value for the skew.

If it is determined at the test step 176 that the skew is not greater than the predetermined minimum value therefor, then control transfers from the test step 176 to a step 177 where the system waits for a predetermined amount of time (e.g., one second) prior to transferring back to the step 176 to test again if the skew is greater than the predetermined minimum value therefor. If it is determined at the test step 176 that the skew is greater than the predetermined minimum value, then control transfers from the test step 176 to a step 178 where a sequence number is assigned to the received cycle. In an embodiment herein, each received cycle is assigned a unique sequence number that may be used to determine relative order of receipt of the cycles. Use of the sequence number is described in more detail elsewhere herein. Following the step 178 is a step 182 where the sequence number is incremented.

Following the step 182 is a test step 184 where it is determined if the received cycle is for one of the receive buffers 144, 154 corresponding to the active leg. If so, then control transfers from the test step 184 to a step 186 where processing for receiving data for the active leg is performed. The processing provided at the step 186 is described in more detail elsewhere herein. Following the step 186, control transfers back to the step 174 for another iteration. If it is determined at the test step 184 that the received cycle is for the one of the receive buffers 144, 154 corresponding to the passive leg, then control transfers from the test step 184 to a step 188 where processing for receiving data for the passive leg is performed. The processing provided at the step 188 is described in more detail elsewhere herein. Following the step 188, control transfers back to the step 174 for another iteration.

Generally, the site 104 handles separately receiving SRDF/A data from the sites 102, 103 by designating one leg (path) an "active leg" while the other leg is designated a "passive leg". For example, the path from the site 102 to the site 104 may be the active leg while the path from the site 103 to the site 104 is the passive leg. Which of the paths is designated active or passive may change, but in steady state operation there is always one active leg and one passive leg. In embodiments having more than two paths, there may be one active leg and the remaining paths may be passive legs. Data from the active leg is destaged at the site 104 while data from the passive leg is discarded. If the active leg falls behind and/or fails, the roles are swapped so that the active leg becomes the passive leg and vice versa.

Figure 9:
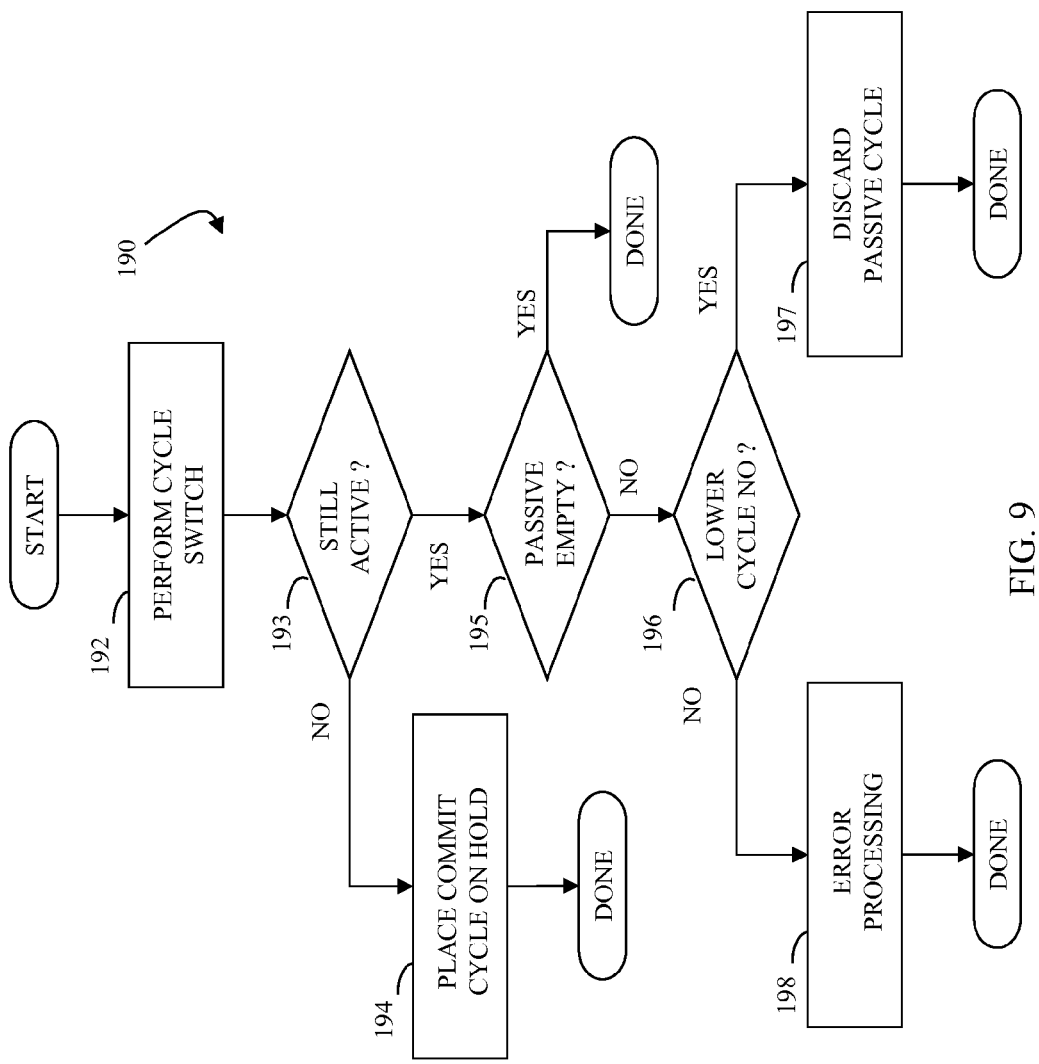
FIG. 9 is a flow chart illustrating steps performed in connection with processing active asynchronous data cycles according to an embodiment of the system described herein.

Referring to FIG. 9, a flow chart 190 illustrates processing performed in connection with the step 186 of the flow chart 170, described above, where SRDF/A data is received for the active leg. Processing begins at a first step 192 where an SRDF/A cycle switch is performed so that the received cycle becomes the commit cycle that can be destaged at the site 104. Following the step 192 is a test step 193 where it is determined if the active leg is still active. As discussed in more detail elsewhere herein, cycle switching may be suspended in connection with swapping active and passive roles. Thus, it is possible that cycle switching had been suspended and resumed prior to completion of the step 192 so that, following the cycle switch at the step 192, the active and passive roles are reversed.

If it is determined at the test step 193 that the active leg is no longer active, then control transfers from the test step 193 to a step 194 where the commit cycle is placed on hold. As discussed elsewhere herein, it is possible to receive an SRDF/A cycle for the passive leg, perform a cycle switch therefor, but then not destage the resulting commit cycle so that the commit cycle remains on hold. Following the step 194, processing is complete. If it is determined at the test step 193 that the active leg is still active, then control transfers from the test step 193 to a test step 195 where it is determined if there is a committed cycle on hold for the passive leg. If it is determined at the test step 195 that the commit buffer of the passive leg does not contain a cycle on hold, then processing is complete. Otherwise, control transfers from the test step 195 to a test step 196 where it is determined if the commit cycle on hold for the passive leg has a lower cycle number than the commit cycle for the active leg that is being processed. If the commit cycle for the passive leg has a lower cycle number, then control transfers from the test step 196 to a step 197 where the commit cycle for the passive leg is discarded. The commit cycle for the passive leg may be discarded because it has been superseded by the cycle just received on the active leg. Following the step 197, processing is complete.

If it is determined at the test step 196 that the commit cycle of the passive leg does not have a lower cycle number than the commit cycle for the active leg that has just been received, then control transfers from the test step 196 to a step 198 where error processing is performed. It should never occur that the passive commit buffer has a higher cycle number than the active commit buffer. Accordingly, this is an error condition. Any appropriate error processing may be performed at the step 198, including informing a user of the error. Following the step 198, processing is complete.

Figure 10:
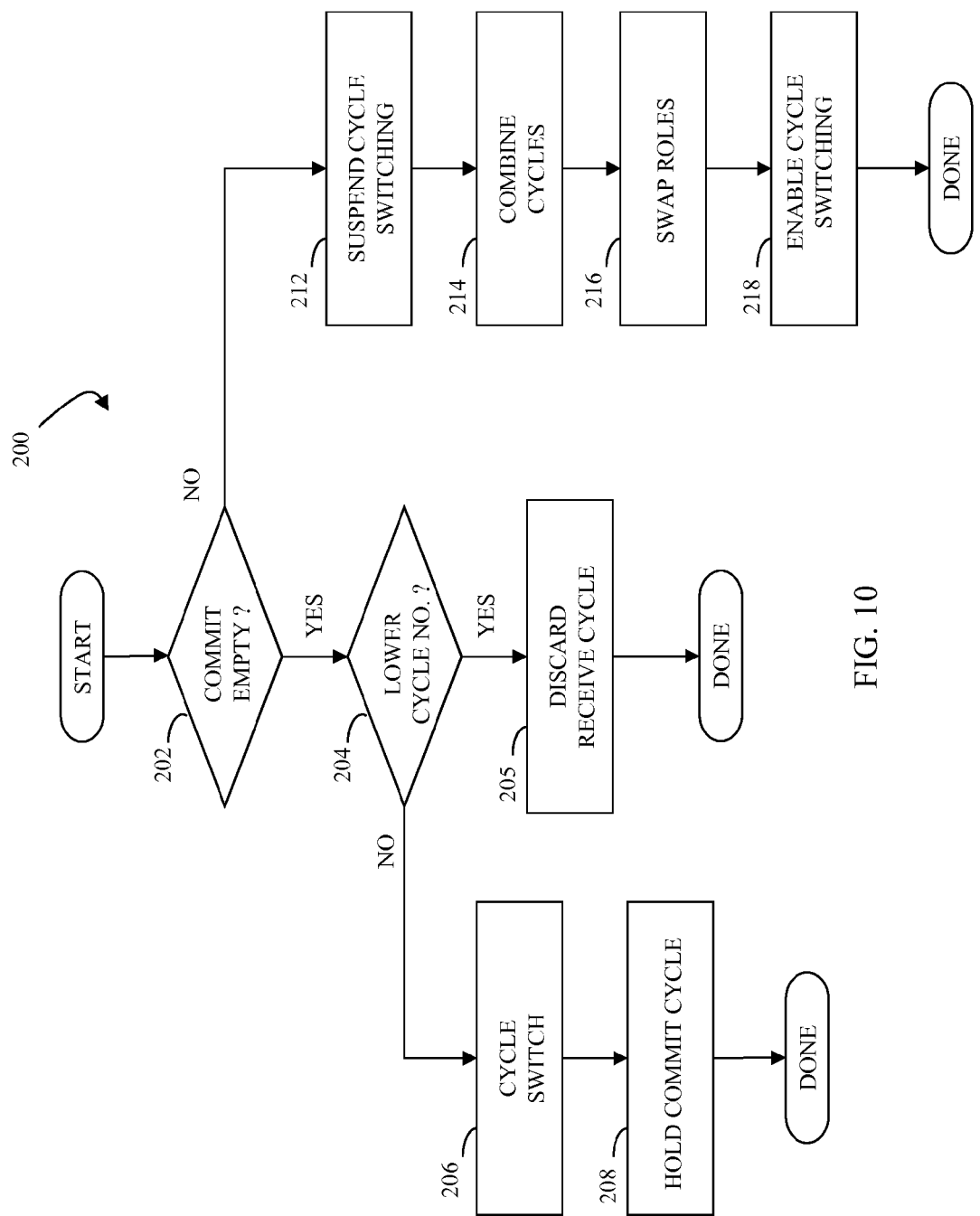
FIG. 10 is a flow chart illustrating steps performed in connection with processing passive asynchronous data cycles according to an embodiment of the system described herein.

Referring to FIG. 10, a flow chart 200 illustrates processing performed in connection with the step 188 of the flow chart 170, described above, where SRDF/A data is received for the passive leg. Processing begins at a first step 202 where it is determined if the commit cycle (in one of the commit buffers 145, 155) is empty. If so, then control transfers from the test step 202 to a test step 204 where it is determined if the passive cycle that has just been received has a lower cycle number than an active cycle that has just been received. If so, then control transfers from the test step 204 to a step 205 where the received passive cycle is discarded. Following the step 205, processing is complete.

If it is determined at the test step 204 that the received passive cycle does not have a lower cycle number than the most recently received active cycle, then control transfers from the test step 204 to a step 206 where a cycle switch is performed. Following the step 206 is a step 208 where the data in the commit buffer is placed on hold (not destaged). As described elsewhere herein, a received passive cycle may be placed on hold in the commit buffer and then subsequently discarded when an active cycle having a higher cycle number is received. Following the step 208, processing is complete.

If it is determined at the test step 202 that the commit cycle is not empty (and thus the active leg is falling behind the passive leg), then control transfers from the test step 202 to a step 212 where cycle switching is suspended. Following the step 212 is a step 214 where the data for the receive cycle is combined with data from the commit cycle into the commit cycle so that the receive cycle is empty and the commit cycle contains data for two cycles. Note that, after the combination, the commit cycle is assigned the higher of the two cycle numbers from the two cycles. Following the step 214 is a step 216 where the active and passive roles are swapped. Following the step 216 is a step 218 where cycle switching is resumed. Following the step 218, processing is complete.

Figure 11:
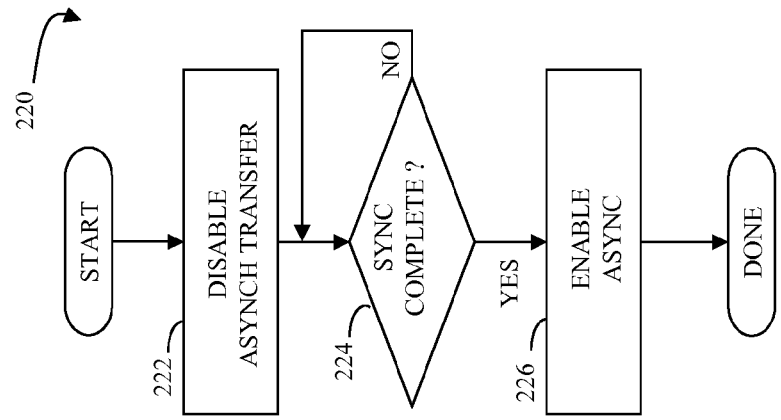
FIG. 11 is a flow chart illustrating disabling and reenabling asynchronous transfer of data in connection with handling data failover according to an embodiment of the system described herein.

Referring to FIG. 11, a flow chart 220 illustrates steps performed in connection with one of the sites 102, 103 recovering after a failure. Processing begins at a first step 222 where asynchronous transfer is disabled. Following the step 222 is a test step 224 where it is determined if synchronization between the sites 102, 103 is complete. If not, control transfers back to the step 224 to continue to poll. Otherwise, once the sites 102, 103 are synchronized, control transfers from the test step 224 to a step 226 where asynchronous transfer is enabled. Following the step 226, processing is complete. The processing illustrated by the flow chart 220 may be provided in connection with all recovery scenarios illustrated herein.

In some embodiments, it is also possible to suspend asynchronous transfers for only the one of the sites 102, 103 that has failed and is being resynchronized while the other one of the sites continues to send asynchronous data to the site 104. In such a case, the step 222 disables asynchronous transfers only for the failed one of the sites 102, 103 while the step 226 enable asynchronous transfers for the same one of the sites 102, 103. In some cases, the mechanism used to synchronize the sites (e.g., VPLEX) may handle the processing illustrated by the flowchart 220.

In some cases, the passive receive and commit cycles may be moved to the source site (i.e., either the site 102 or the site 103) and some of the logic performed at the site 104 may be moved to the source site. Doing this may reduce transmission bandwidth requirements.

It is also possible to coordinate cycle switching between the sites 102, 103 so that asynchronous transfers from the site 102 to the site 104 occur at the same time and contain the same data as asynchronous transfers from the site 103 to the site 104. Note that, as discussed elsewhere herein, the sites 102, 103 are synchronized so as to contain the same data so that, when cycle switching is coordinated, the cycles of asynchronous data from the different sources 102, 103 contain essentially the same data. As explained in more detail elsewhere herein, such coordination provides for efficiencies in terms of the amount of data transferred from the sites 102, 103 to the site 104 as well as the amount of storage space and processing provided at the site 104. Any appropriate mechanism may be used for coordinating cycle switching between the sites 102, 103, including the mechanism described in U.S. Pat. No. 7,054,883 titled "VIRTUAL ORDERED WRITES FOR MULTIPLE STORAGE DEVICES", which is incorporated by reference herein.

Figure 12:
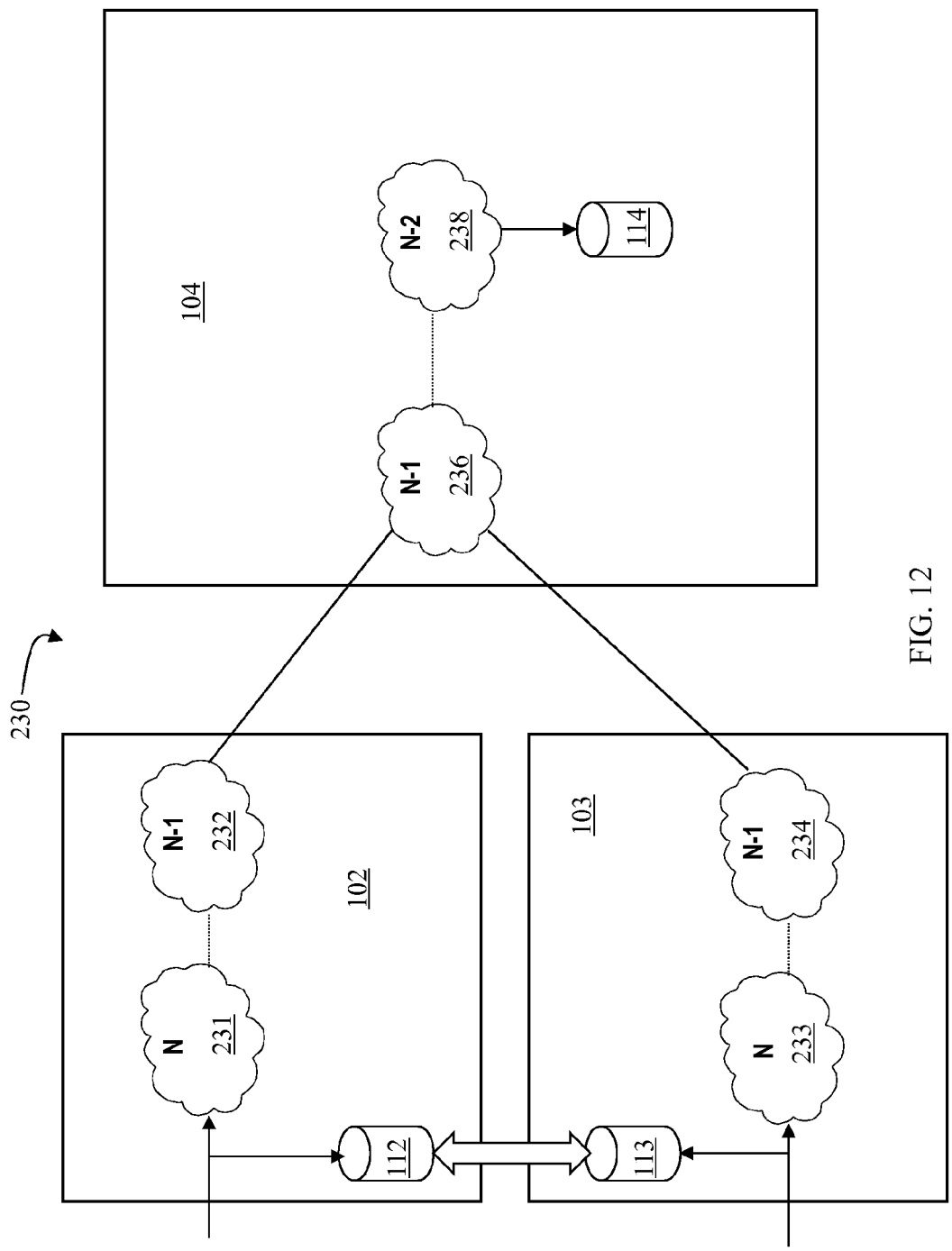
FIG. 12 is a schematic diagram showing a flow of data between two sites and a third site according to an embodiment of the system described herein.

Referring to FIG. 12, a diagram 230 shows an embodiment in which the sites 102, 103 coordinate cycle switching. The site 102 includes a capture buffer 231 and a transmit buffer 232. Similarly, the site 103 includes a capture buffer 233 and a transmit buffer 234. Note, however, that unlike embodiments where cycle switching between the sites 102, 103 is not coordinated, the site 104 has a single receive buffer 236 and a single commit buffer 238.

In one embodiment, each of the sites 102, 103 may independently transfer all of the data to the site 104. Since cycle switching is coordinated, the site 104 receives the same data from each of the sites 102, 103 in the same cycle. Thus, in this embodiment, the site 104 may discard duplicate data that is received. Of course, this embodiment does not reduce the amount of data transmitted by the sites 102, 103, but it does reduce the storage/processing requirements at the site 104 by eliminating duplicate capture and commit buffers. In addition, failure handling and recovery is fairly straight-forward since, when one of the sites 102, 103 (and/or corresponding links) fails, the site 104 still receives all of the data from the non-failing one of the sites 102, 103.

In other embodiments, it may be desirable to separate the data transmitted from the sites 102, 103 into separate portions so that one of the sites 102, 103 transmits a first portion of the data and the other one of the sites 102, 103 transmits a second portion (the remaining portion) of the data. Thus, each of the sites 102, 103 uses less bandwidth for transmission and, since the sites 102, 103 share the work for transferring the transmission cycle data, the asynchronous data is transferred sooner to the site 104 than if the sites 102, 103 were each separately transferring all of the data. In some of these embodiments, the transmit buffers 232, 234 and the capture buffers 231, 233 may still be identical and contain all of the data for the cycles, but only a portion of the data is transmitted by each of the sites 102, 103. In other embodiments, the capture buffers 231, 233 and the transmit buffers 232, 234 contain different portion of data for the corresponding cycles.

Note that it is possible to use any appropriate criteria to determine which portion of the data is transmitted by each of the sites 102, 103. For instance, when the data being transmitted is from many logical volumes, each having a volume number, then one of the sites 102, 103 may transmit data from even numbered volumes while the other one of the sites 102, 103 may transmit data from odd numbered volumes. In another embodiment, one of the sites may begin transmitting data from a highest numbered volume and work down through lower numbered volume while the other one of the sites 102, 103 may transmit data from a lowest numbered volume and work up through higher numbered volumes. In other cases, the criteria may be whether data was written locally or transferred from another site.

Figures 13, 14:
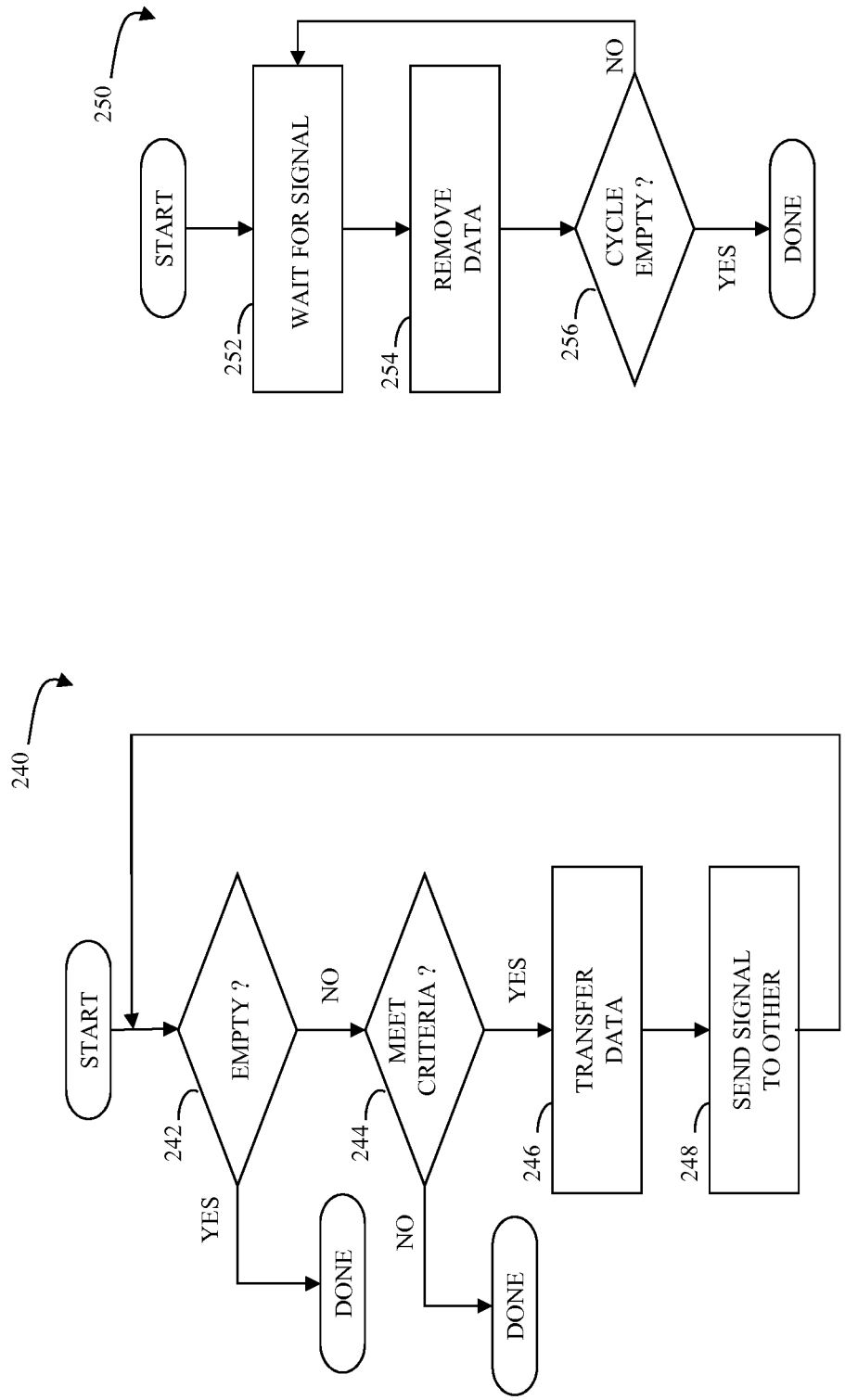
FIG. 13 is a flow chart illustrating processing performed in connection with selectively transferring data to an asynchronous site according to an embodiment of the system described herein.
FIG. 14 is a flow chart illustrating processing performed in connection with removing data from a transmit cycle according to an embodiment of the system described herein.

Referring to FIG. 13, a flow chart 240 illustrates steps performed in connection with one of the sites 102, 103 transmitting data to the site 104 in an embodiment where the transmit buffers 232, 234 and the capture buffers 231, 233 contain all of the data for the cycles, but only a portion of the data is transmitted by each of the sites 102, 103. Processing begins at a test step 242 where it is determined if the transmit buffer is empty. If so, processing is complete. Otherwise, control transfers from the test step 242 to a test step 244 where it is determined if any of the remaining data meets whatever criteria is being used (e.g., odd/even). As discussed elsewhere herein, criteria may be used to determine which of the sites 102, 103 transmits particular data to the site 104. Of course, the test at the step 244 may not be necessary for embodiments like the embodiment where one of the sites 102, 103 starts at a highest number volume and works to lower number volumes while the other one of the sites 102, 103 starts at a lowest number volume and works to higher number volumes. In such cases, the processing illustrated by the flow chart 240 is performed until all of the data in the buffer is transmitted.

If it is determined at the test step 244 that none of the remaining data in the transmit buffer meets the criteria, then processing is complete—all of the data meeting the particular criteria has been transmitted from the site. Otherwise, control transfers from the test step 244 to a step 246 where a packet of data (or some other appropriate incremental amount of data) is transmitted. Following the step 246 is a step 248 where a signal is sent to the other site to indicate the particular data that was transmitted at the step 246. As discussed elsewhere herein, as one of the sites transmits particular data, the other one of the sites may delete the corresponding data from the transmit buffer. Following the step 248, control transfers back to the step 242 for another iteration.

Referring to FIG. 14, a flow chart 250 illustrates steps performed in connection with one of the sites 102, 103 receiving a signal from an other one of the sites 102, 103 to indicate that the other one of the sites 102, 103 has transmitted particular data to the site 104. The processing illustrated by the flow chart 250 handles the signal generated at the step 248, discussed above. Processing begins at a first step 252 where the system waits for the signal. Following the step 252 is a step 254 where data corresponding to the particular data indicated by the signal as having been transmitted is removed. Following the step 254 is a test step 256 where it is determined if the transmit buffer is empty. If so, then processing is complete. Otherwise, control transfers back to the step 252 for another iteration.

In the case of failure of one of the sites 102, 103 and/or a corresponding link, the non-failing one of the sites 102, 103 handles recovery by simply transmitting all of the remaining data in the transmit buffer without regard as to whether any of the remaining data meets the criteria for being transmitted by the non-failing one of the sites 102, 103. That is, the non-failing one of the sites 102, 103 simply transmits all of the data in the transmit buffer, including data that would otherwise have been transmitted by the other (failed) one of the sites 102, 103.

Figure 15:
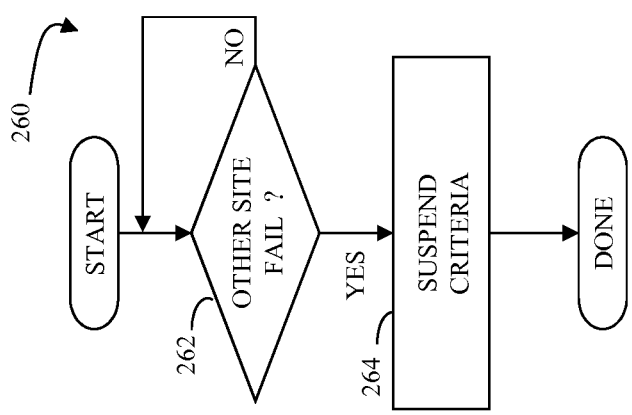
FIG. 15 is a flow chart illustrating processing performed in connection with suspending selective criteria for data transfer according to an embodiment of the system described herein.

Referring to FIG. 15, a flow chart 260 illustrates steps performed by one of the sites 102, 103 in connection with failure of the other one of the sites 102, 103. Processing begins at a first step 262 where it is determined if the other one of the sites 102, 103 has failed. If not, then control transfers back to the step 262 to continue polling. Otherwise, control transfers from the test step 262 to a step 264 where the criteria used to determine which of the sites 102, 103 sends which data is suspended. Suspending the criteria at the step 264 effectively eliminates the step 244 in the flow chart 240 of FIG. 13. Following the step 264, processing is complete.

As discussed elsewhere herein, for some embodiments, it is possible for the capture buffers 231, 233 to contain different portions of data for the same cycle, in which case the transmit buffers 232, 234 will also contain different portions of data for the same cycle. In these embodiments, it is not necessary to selectively transmit data from the transmit buffers 232, 234 at each of the sites 102, 103, since each of the transmit buffers 232, 234 already contains a particular portion of the data for the cycle Embodiments that handle the data this way are most efficient in terms of storage at the sites 102, 103 since the capture and transmit buffers 231, 232, 233, 234 each contain only a portion of the data for the corresponding cycle. The trade-off, however, is the increased processing/complexity to handle this.

Figure 16:
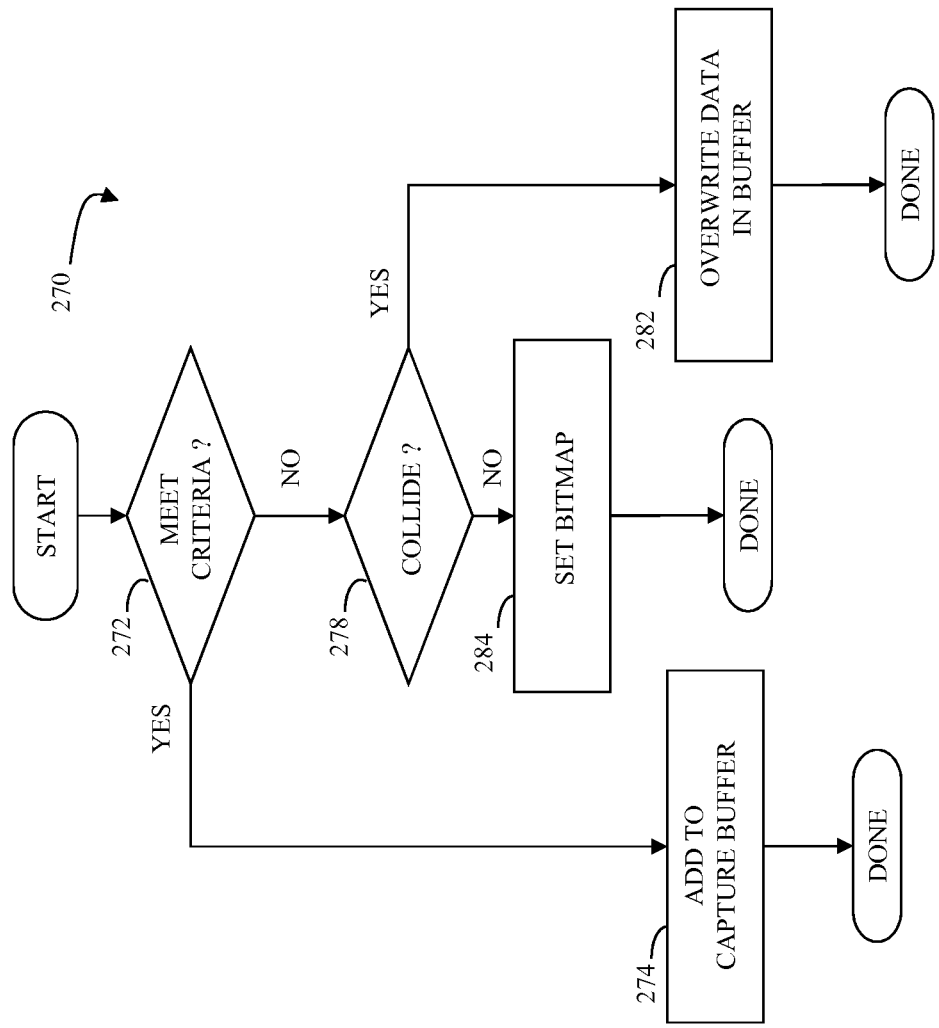
FIG. 16 is a flow chart illustrating processing performed in connection with transferring data to an asynchronous site and maintaining a record of data sent by another site according to an embodiment of the system described herein.

Referring to FIG. 16, a flow chart 270 illustrates processing performed in connection with handling writes to the sites 102, 103 for embodiments where the capture buffers 231, 233 contain different portions of data for the same cycle. Processing begins at a first step 272 where it is determined if the data being written meets a criteria for being provided to the local capture buffer. As discussed elsewhere herein, there may be different criteria that may be used for determining which of the sites 102, 103 handles particular portions of data. For example, one of the sites 102, 103 may handle data associated with odd-numbered volumes while the other one of the sites handles data associated with even-numbered volumes. As another example, each of the sites 102, 103 may distinguish between data written locally thereto by a computing device (or similar) and data written by the other site for synchronization. In an embodiment herein, the site 102 provides data written directly thereto to the capture buffer 231 while the site 103 provides data written directly thereto to the capture buffer 233. Of course, any other appropriate criteria may be used to determine which of the capture buffers 231, 233 will be used for the data being written.

If it is determined at the test step 272 that the data being written does meet the criteria for being stored in the capture buffer of the site, then control transfers from the test step 272 to a step 274 where the data being written is added to the capture buffer. Following the step 274, processing is complete. If it is determined at the step 272 that the data being written does not meet the criteria for being provided in the capture buffer at the site (and thus is being provided in the capture buffer at the other site), then control transfers from the test step 272 to a test step 278 where it is determined if there is a collision between the data being written and data already in the capture buffer. A collision occurs when the data being written is from the same location (e.g., same logical address) as data already in the capture buffer. Of course, any overlap is also a collision even if the locations are not identical.

If it is determined at the test step 278 that there is a collision, then control transfers from the test step 278 to a step 282 where the data in the capture buffer is overwritten with the data being written. Following the step 282, processing is complete. If it is determined at the test step 278 that there is not a collision, then control transfers from the test step 278 to a step 284 where a bitmap is set indicating the storage location in the site (e.g., logical address of a volume) of the data being written. In an embodiment herein, a bitmap may be used to indicate data being handled by the other one of the sites. As discussed in more detail elsewhere herein, the bitmap may be used for recovery of the other site fails. Note that the bitmap may be discarded after the corresponding cycle is successfully transferred to the site 104. Note also that the granularity of the bitmap may be different than the granularity of data in the capture buffer. For example, each bit of the bitmap may indicate an entire track while the data in the capture buffer is provided a block at a time, where a track is made up of a number of blocks.

Figure 17:
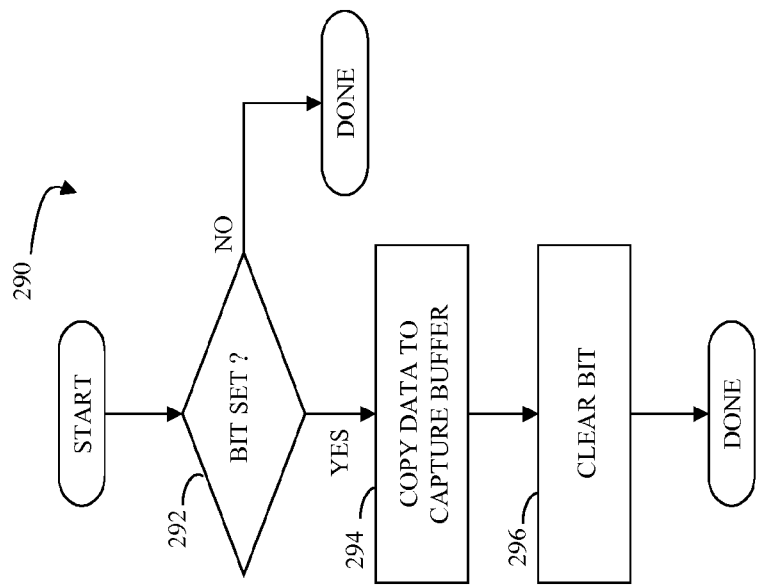
FIG. 17 is a flow chart illustrating processing performed in connection with a write operation to a non-failing site after failure of another site according to an embodiment of the system described herein.

Referring to FIG. 17, a flow chart 290 illustrates processing performed in connection with a write operation at the non-failing one of the sites 102, 103 after one of the sites 102, 103 and/or a link thereto has failed and prior to a first cycle switch after the failure. Processing begins at a first test step 292 where it is determined if a bit is set corresponding to the data being written. As discussed elsewhere herein, a bit may be set indicating that an other one of the sites is handling data transmission to the site 104. These bits may then be used to facilitate recovery so that, for example, a bit in a table used by the site 102 may indicate that a particular track has been written and the data therefor is to be transmitted by the site 103 to the site 104. Of course, when the site 103 fails, the site 102 may use the information to know which data to send to the site 104.

If it is determined at the test step 292 that the bit is not set (no data was to be sent by the failed one of the site 2 102, 103), then processing is complete. Otherwise, control transfers from the test step 292 to a step 294 where data corresponding to the bit that is set, along with the data that is being written, is provided to the capture buffer. Following the step 294 is a step 296 where the bit is cleared. Following the step 296, processing is complete.

Figure 18:
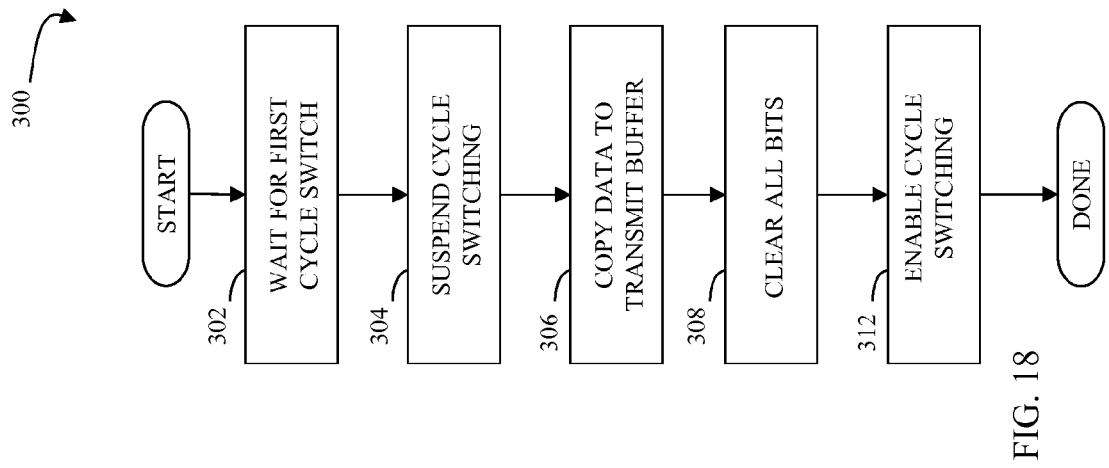
FIG. 18 is a flow chart illustrating processing performed in connection with recovery after a site failure according to an embodiment of the system described herein.

Referring to FIG. 18, a flow chart 300 illustrates steps performed in connection with transferring data indicated by the bitmap to the site 104. In an embodiment herein, data may be transferred by copying all of the data indicated by the set bits into the transmit cycle and then relying on SRDF/A to properly transfer the data to the site 104.

Processing begins at a step 302 where the system waits for a first cycle switch to occur. Following the step 302 is a step 304 where cycle switching is suspended. Following the step 304 is a step 306 where data indicated by the bitmap is added to the transmit buffer. As discussed elsewhere herein, the bitmap indicates data that would have been transferred to the site 104 by the other site. Following the step 306 is a step 308 where the bitmap corresponding to the protected tracks is cleared. Following the step 308 is a step 312 where cycle switching is resumed. Following the step 312, processing is complete and the site 104 has been recovered to a consistent state.

Figure 19:
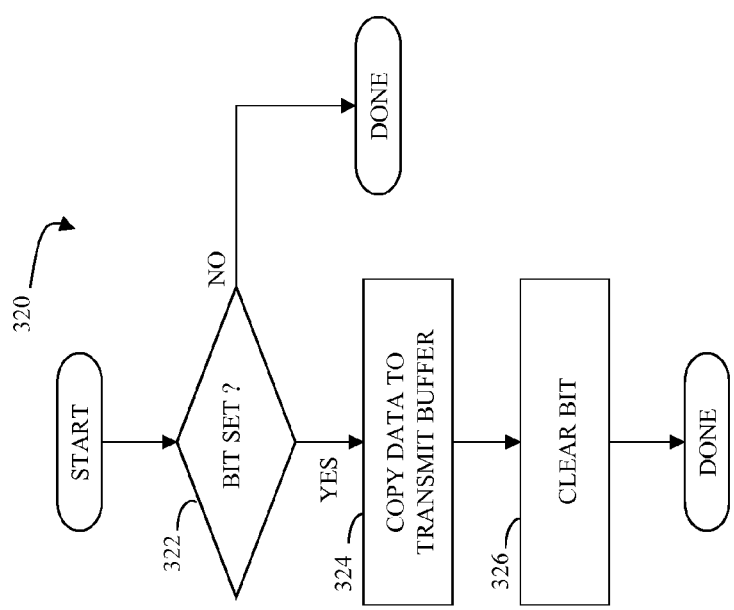
FIG. 19 is a flow chart illustrating processing performed in connection with a write operation to a non-failing site after failure of another site according to an embodiment of the system described herein.

Referring to FIG. 19, a flow chart 320 illustrates processing performed in connection with a write operation at the non-failing one of the sites 102, 103 while the processing illustrated by the flow chart 300 of FIG. 18 is being performed. Processing begins at a first test step 322 where it is determined if a bit is set corresponding to the data being written. As discussed elsewhere herein, a bit may be set indicating that an other one of the sites is handling data transmission to the site 104. If it is determined at the test step 322 that the bit is not set (no data was to be sent by the failed one of the sites 102, 103), then processing is complete. Otherwise, control transfers from the test step 322 to a step 324 where data corresponding to the bit that is set, along with the data that is being written, is provided to the transmit buffer. Following the step 324 is a step 326 where the bit is cleared. Following the step 326, processing is complete.

In an alternative embodiment, the system illustrated by FIG. 6 may be managed using shared cycle number where the sites 102-104 each access and modify a common cycle number. The shared cycle number is associated with the transmit buffer and the capture buffer at each of the source sites 102, 103. Each of the source sites 102, 103 increments the shared cycle number whenever a cycle switch occurs. The site 104 then uses the associated shared cycle number to determine an action to be performed with the received data. The shared cycle number is different from the cycle number used for providing asynchronous data transfer from the sites 102, 103 to the site 104.

Figure 20:
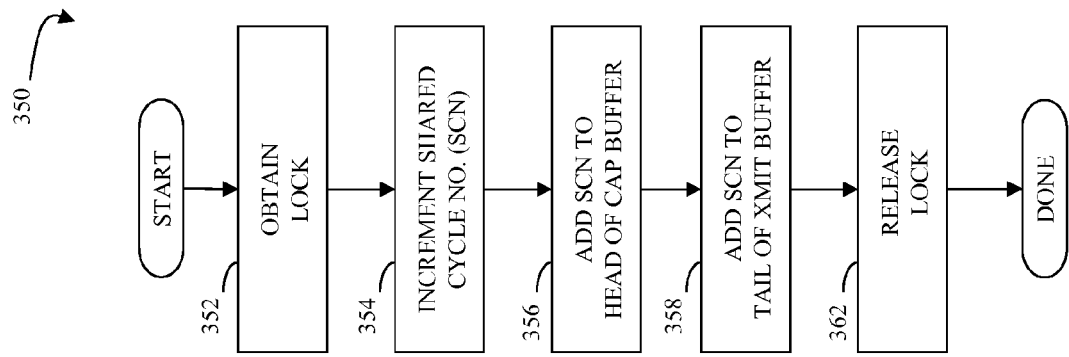
FIG. 20 is a flow chart illustrating processing performed in connection with two sites sharing a cycle number in connection with asynchronous transfer of data to a third site according to an embodiment of the system described herein.

Referring to FIG. 20, a flow chart 350 illustrates steps performed by each of the sites 102, 103 to manage the shared cycle number in connection with a cycle switch. Processing begins at a first step 352 where a lock is obtained to prevent any other process from changing the shared cycle number. Thus, the processing illustrated by the flow chart 350 is performed by one process at a time (i.e., only one of the sites 102, 103). Following the step 352 is a step 354 where the shared cycle number is incremented.

Following the step 354 is a step 356 where the shared cycle number is added to the HEAD of the capture buffer. Following the step 356 is a step 358 where the shared cycle number is added to the TAIL of the transmit buffer. Use of the HEAD and TAIL values associated with each of the buffers is discussed in more detail elsewhere herein. Following the step 358 is a step 362 where the lock (obtained at the step 352) is released. Following the step 362, processing is complete.

Figure 21:
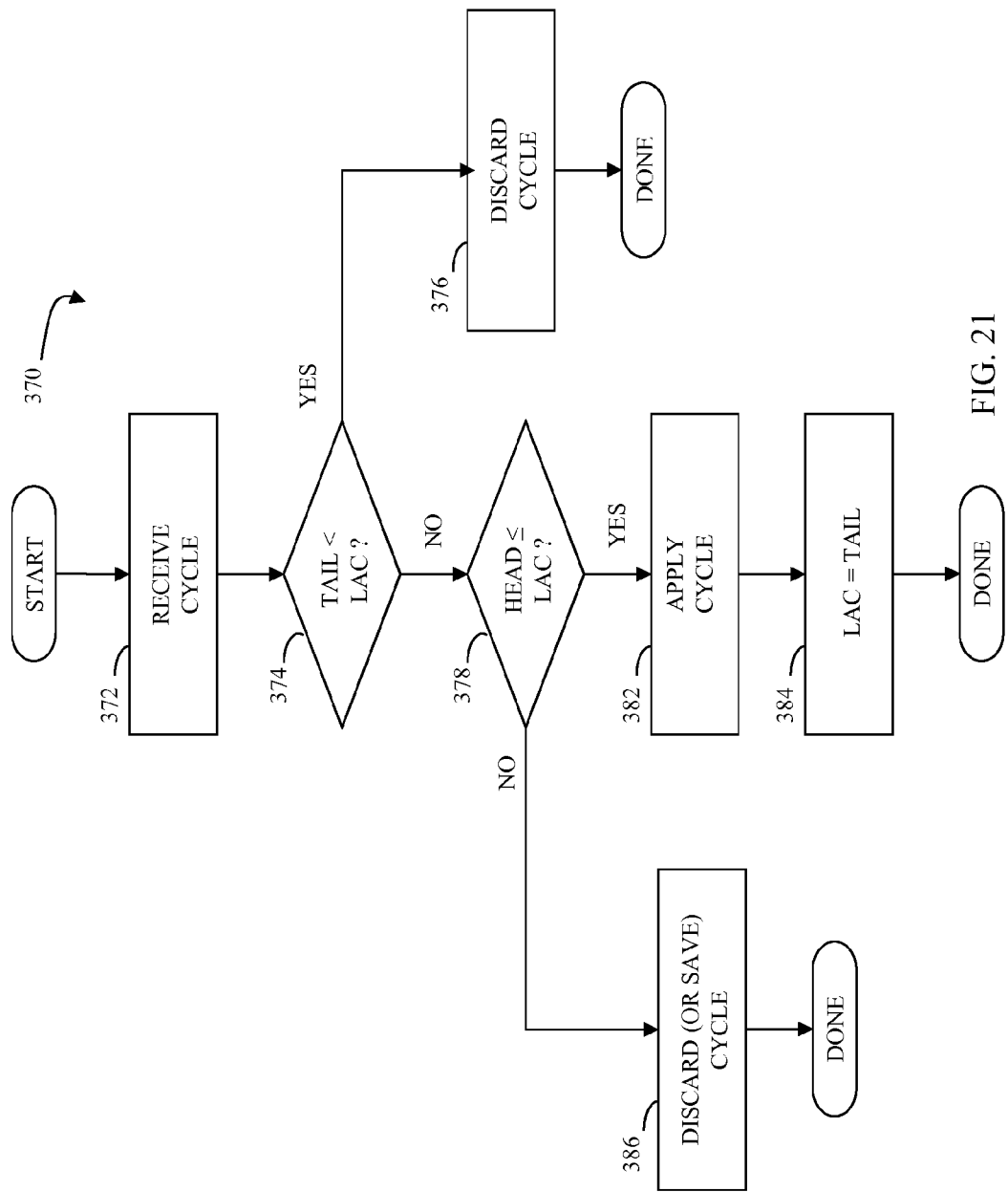
FIG. 21 is a flow chart illustrating processing performed in connection with a site receiving asynchronous data and a shared cycle number from two sites according to an embodiment of the system described herein.

Referring to FIG. 21, a flow chart 370 illustrates processing performed by the site 104 in connection with receiving and handling a cycle's worth of asynchronous data from one of the sites 102, 103. Processing begins at a first step 372 where the cycle's worth of data is received. Following the step 372 is a test step 374 where it is determined if the value of the TAIL (discussed above) associated with the cycle is less than the value of the last applied cycle (LAC). As discussed in more detail elsewhere herein, the value of LAC is set to the tail of the last applied cycle. If it is determined at the test step that the TAIL of the received cycle is less than the value of LAC, then control transfers from the step 374 to a step 376 where the received cycle is discarded. Note that the value of the TAIL being less than LAC means that all of the data in the received cycle has already been received and applied at the site 104. That is, all of the data received from one of the sites 102, 103 had already been received from another one of the sites 102, 103. Following the step 376, processing is complete.

If it is determined at the test step 374 that the TAIL is not less than LAC, then control transfers from the test step 374 to a test step 378 where it is determined if the value of the HEAD of the received cycle is less than or equal to the value of LAC. If so, then control transfers from the test step 378 to a step 382 where the received cycle is applied. Following the step 382, control transfers to a step 384 where the value of LAC is set to the TAIL of the cycle of asynchronous data applied at the step 382. Following the step 384, processing is complete.

If it is determined at the step 378 that the HEAD Is not less than or equal to the value of LAC, then there is a gap between the last applied cycle of data and the received cycle. The gap may be due to startup conditions of a previously-failed one of the sites 102, 103. In such a case, control transfers from the test step 378 to a step 386 where the data is discarded. Alternatively, it is possible to save (but not apply) the data at the step 386, in which case the data may be applied later once the data from the gap has been received and applied. Of course, discarding the data at the step 386 is the more straight-forward approach. Following the step 386, processing is complete.

Various embodiments discussed herein may be combined with each other in appropriate combinations in connection with the system described herein. The system described herein may be implemented using the hardware described herein, variations thereof, or any other appropriate hardware capable of providing the functionality described herein. Thus, for example, one or more storage devices having components as described herein may, alone or in combination with other devices, provide an appropriate platform that executes any of the steps described herein.

In some instances, the order of steps in the flowcharts, flow diagrams and/or described flow processing may be modified, where appropriate. Further, various aspects of the system described herein may be implemented using software, hardware, a combination of software and hardware and/or other modules or devices having the described features and performing the described functions. Software implementations of the system described herein may include executable code that is provided in a non-volatile computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

While the invention has been disclosed in connection with various embodiments, modifications thereon will be readily apparent to those skilled in the art. Accordingly, the spirit and scope of the invention is set forth in the following claims.

What is claimed is:

1. A method of handling asynchronous data provided by at least two sources, comprising:
   receiving a first portion of the data from a first one of the sources;
   receiving a second portion of the data from a second one of the sources, wherein the first and second portions provide the same data and wherein the sources are synchronized with each other independently of a site that receives the data from the sources;
   saving at least one of the portions containing more recent data;
   establishing an active leg for data provided by one of the sources;
   establishing a passive leg for data provided by an other one of the sources; and
   saving data provided through the active leg.

2. A method, according to claim 1, wherein all of the portions are saved.

3. A method, according to claim 1, wherein a portion that contains data that is older than the more recent data is discarded.

4. A method, according to claim 1, further comprising:
   discarding data provided through the passive leg that is older than data previously provided through the active leg.

5. A method, according to claim 4, further comprising:
   temporarily saving data provided through the passive leg that is not older than data previously provided through the active leg.

6. A method, according to claim 5, wherein data from the passive leg that has been saved temporarily is discarded following receipt of newer data through the active leg.

7. A method, according to claim 6, further comprising:
   swapping active and passive legs in response to there being data from the passive leg already saved when additional data is received through the passive leg.

8. A method, according to claim 7, further comprising:
   combining additional data received through the passive leg and data from the passive leg already saved.

9. Computer software, provided in a non-transitory computer-readable medium, that handles asynchronous data provided by at least two sources, the software comprising:
   executable code that receives a first portion of the data from a first one of the sources;
   executable code that receives a second portion of the data from a second one of the sources, wherein the first and second portions provide the same data and wherein the sources are synchronized with each other independently of a site that receives the data from the sources; and
   executable code that saves at least one of the portions containing more recent data;
   executable code that establishes an active leg for data provided by one of the sources;
   executable code that establishes a passive leg for data provided by an other one of the sources; and
   executable code that saves data provided through the active leg.

10. Computer software, according to claim 9, wherein all of the portions are saved.

11. Computer software, according to claim 9, wherein a portion that contains data that is older than the more recent data is discarded.

12. Computer software, according to claim 9, further comprising:
   executable code that discards data provided through the passive leg that is older than data previously provided through the active leg.

13. Computer software, according to claim 12, further comprising:
   executable code that temporarily saves data provided through the passive leg that is not older than data previously provided through the active leg.

14. Computer software, according to claim 13, wherein data from the passive leg that has been saved temporarily is discarded following receipt of newer data through the active leg.

15. Computer software, according to claim 14, further comprising:
   executable code that swaps active and passive legs in response to there being data from the passive leg already saved when additional data is received through the passive leg.

16. Computer software, according to claim 15, further comprising:
   executable code that combines additional data received through the passive leg and data from the passive leg already saved.

* * * * *